United States Patent
Soto

(10) Patent No.: US 12,461,708 B2
(45) Date of Patent: Nov. 4, 2025

(54) MODIFYING AUDIO SYSTEM PARAMETERS BASED ON ENVIRONMENTAL CHARACTERISTICS

(71) Applicant: Sonos, Inc., Santa Barbara, CA (US)

(72) Inventor: Kurt Thomas Soto, Ventura, CA (US)

(73) Assignee: Sonos, Inc., Goleta, CA (US)

( * ) Notice: Subject to any disclaimer, the term of this patent is extended or adjusted under 35 U.S.C. 154(b) by 232 days.

(21) Appl. No.: 18/247,620

(22) PCT Filed: Oct. 6, 2021

(86) PCT No.: PCT/US2021/071740
§ 371 (c)(1),
(2) Date: Mar. 31, 2023

(87) PCT Pub. No.: WO2022/077000
PCT Pub. Date: Apr. 14, 2022

(65) Prior Publication Data
US 2023/0385017 A1    Nov. 30, 2023

Related U.S. Application Data

(60) Provisional application No. 63/198,244, filed on Oct. 6, 2020.

(51) Int. Cl.
*G06F 3/16* (2006.01)
*H04R 29/00* (2006.01)

(52) U.S. Cl.
CPC .......... *G06F 3/165* (2013.01); *H04R 29/004* (2013.01); *H04R 2430/01* (2013.01)

(58) Field of Classification Search
CPC ......... G06F 3/165; G10L 25/51; H04R 27/00; H04R 2227/005; H04R 2430/01
See application file for complete search history.

(56) References Cited

U.S. PATENT DOCUMENTS 5,440,644 A   8/1995   Farinelli et al.
5,761,320 A   6/1998   Farinelli et al.
(Continued)

FOREIGN PATENT DOCUMENTS

EP   1389853 A1   2/2004
EP   3872619 A1   9/2021
(Continued)

OTHER PUBLICATIONS

AudioTron Quick Start Guide, Version 1.0, Mar. 2001, 24 pages.
(Continued)

*Primary Examiner* — Joseph Saunders, Jr.
(74) *Attorney, Agent, or Firm* — Fortem IP LLP

(57) ABSTRACT

A playback device comprises at least one speaker, at least one processor and data storage having instructions stored thereon that are executed by the at least one processor to cause the playback device to perform functions comprising: receiving input representing one or more environmental characteristics of a real-world environment; determining at least one change in the one or more environmental characteristics based on the input, wherein the one or more environmental characteristics are representative of at least one of a proximity of at least one person to the playback device and a detected sound. An output volume of the playback device and/or a keyword detection threshold are adjusted based on the determined change in the one or more environmental characteristics.

15 Claims, 12 Drawing Sheets

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,942,252 | B2 | 1/2015 | Balassanian et al. |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty, Jr. |
| 2004/0024478 | A1 | 2/2004 | Hans et al. |
| 2007/0142944 | A1 | 6/2007 | Goldberg et al. |
| 2013/0024018 | A1* | 1/2013 | Chang ............... H04S 7/302 700/94 |
| 2016/0077794 | A1 | 3/2016 | Kim et al. |
| 2017/0242651 | A1 | 8/2017 | Lang et al. |
| 2019/0019504 | A1 | 1/2019 | Hatambeiki |
| 2019/0372541 | A1* | 12/2019 | Friant ............... G10L 25/78 |
| 2020/0388268 | A1 | 12/2020 | Saito |

FOREIGN PATENT DOCUMENTS

| | | |
|---|---|---|
| WO | 200153994 | 7/2001 |
| WO | 2003093950 A2 | 11/2003 |
| WO | 2019138652 A1 | 7/2019 |
| WO | 2020141794 A1 | 7/2020 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
International Bureau, International Search Report and Written Opinion mailed on Jan. 31, 2022, issued in connection with International Application No. PCT/US2021/071740, filed on Oct. 6, 2021, 10 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
*Sonos, Inc.* v. *DM Holdings* (No. 14-1330-RGA), Di 219, Claim Construction Opinion (Jan. 12, 2017) (24 pages).
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
International Bureau, International Preliminary Report on Patentability and Written Opinion, mailed on Apr. 20, 2023, issued in connection with International Application No. PCT/US2021/071740, filed on Oct. 6, 2021, 8 pages.

\* cited by examiner

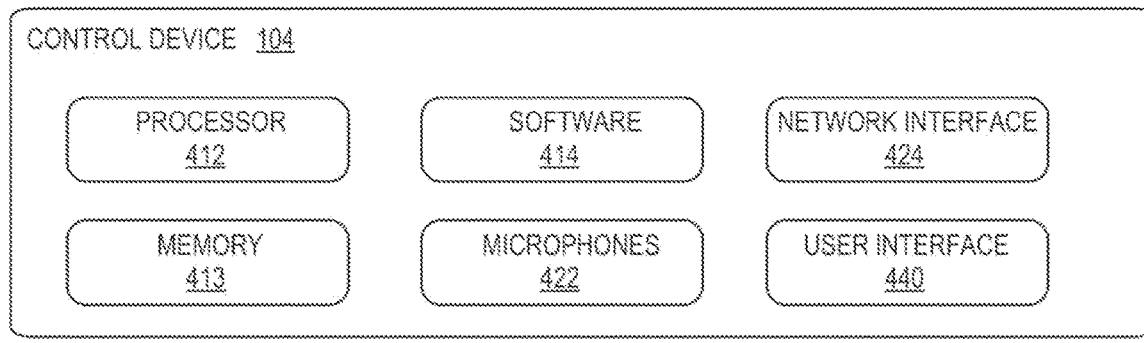
Fig. 4
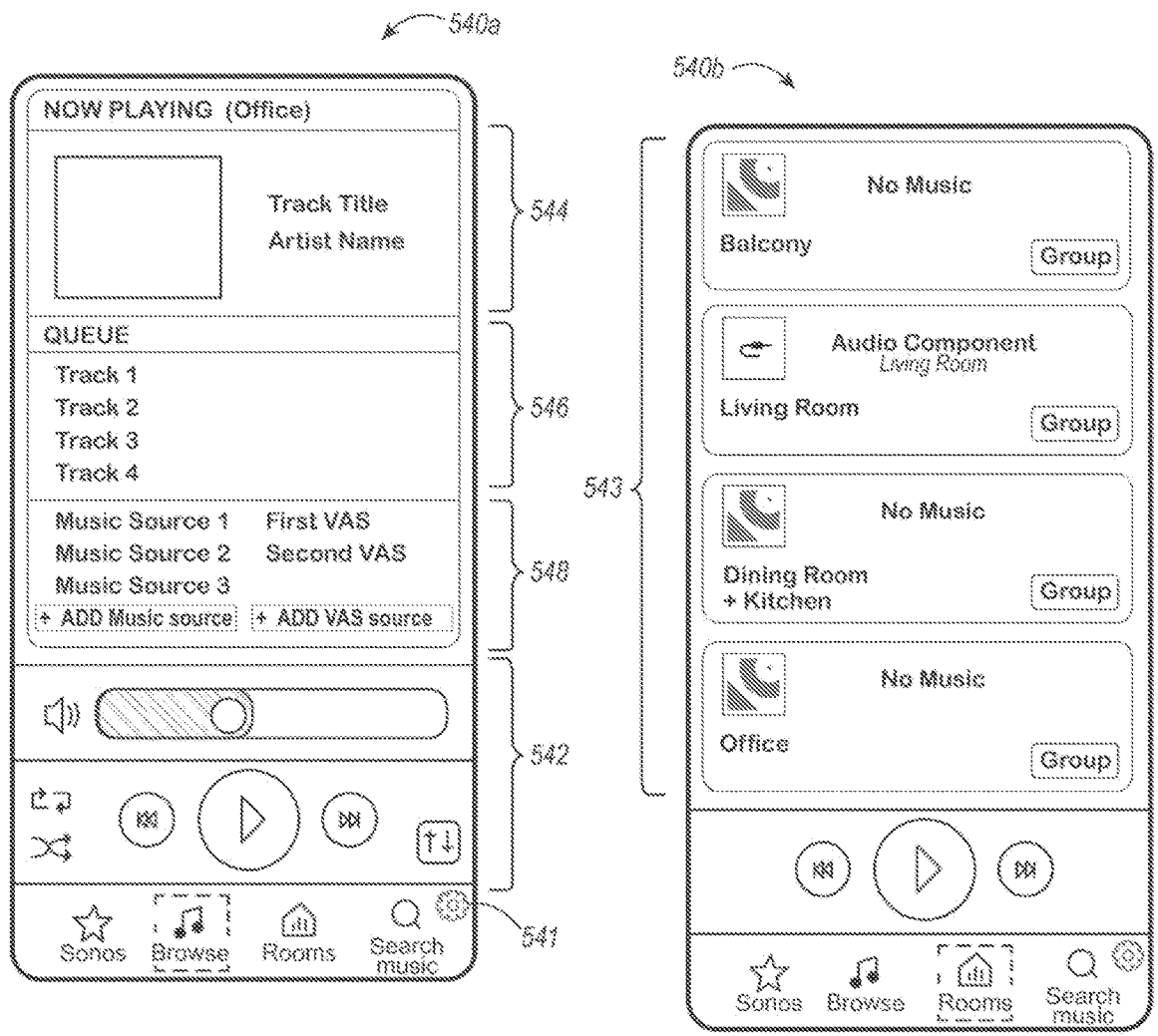
Fig. 5A
Fig. 5B

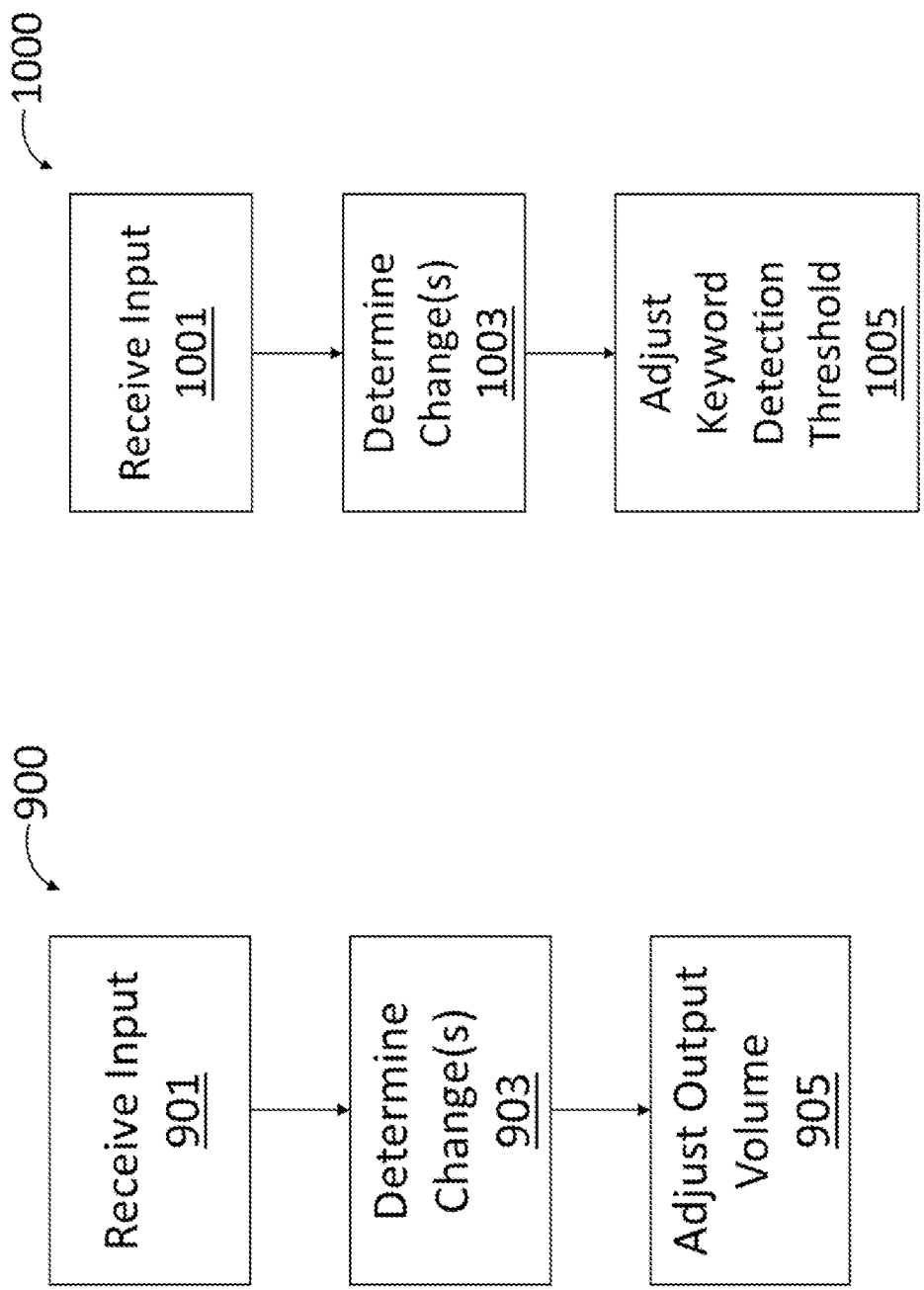

MODIFYING AUDIO SYSTEM PARAMETERS BASED ON ENVIRONMENTAL CHARACTERISTICS

CROSS-REFERENCE TO RELATED APPLICATION

This application is a 371 National Phase application of International Application No. PCT/US2021/071740, filed Oct. 6, 2021, which claims priority to U.S. Patent Application No. 63/198,244, filed Oct. 6, 2020, each of which is incorporated herein by reference in its entirety.

FIELD OF THE DISCLOSURE

The present technology relates to consumer goods and, more particularly, to methods, systems, products, features, services, and other elements directed to media playback systems or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings where:

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 4 is a functional block diagram of an example controller device in accordance with aspects of the disclosure.

FIGS. 5A and 5B are controller interfaces in accordance with aspects of the disclosure.

FIG. 9 is a flow diagram of an example method for adjusting an output volume based on a detected change in environmental characteristics in accordance with aspects of the disclosure;

FIG. 10 is a flow diagram of an example method for adjusting a keyword detection threshold based on a detected change in environmental characteristics in accordance with aspects of the disclosure;

DETAILED DESCRIPTION

I. Overview

Figure 1A:
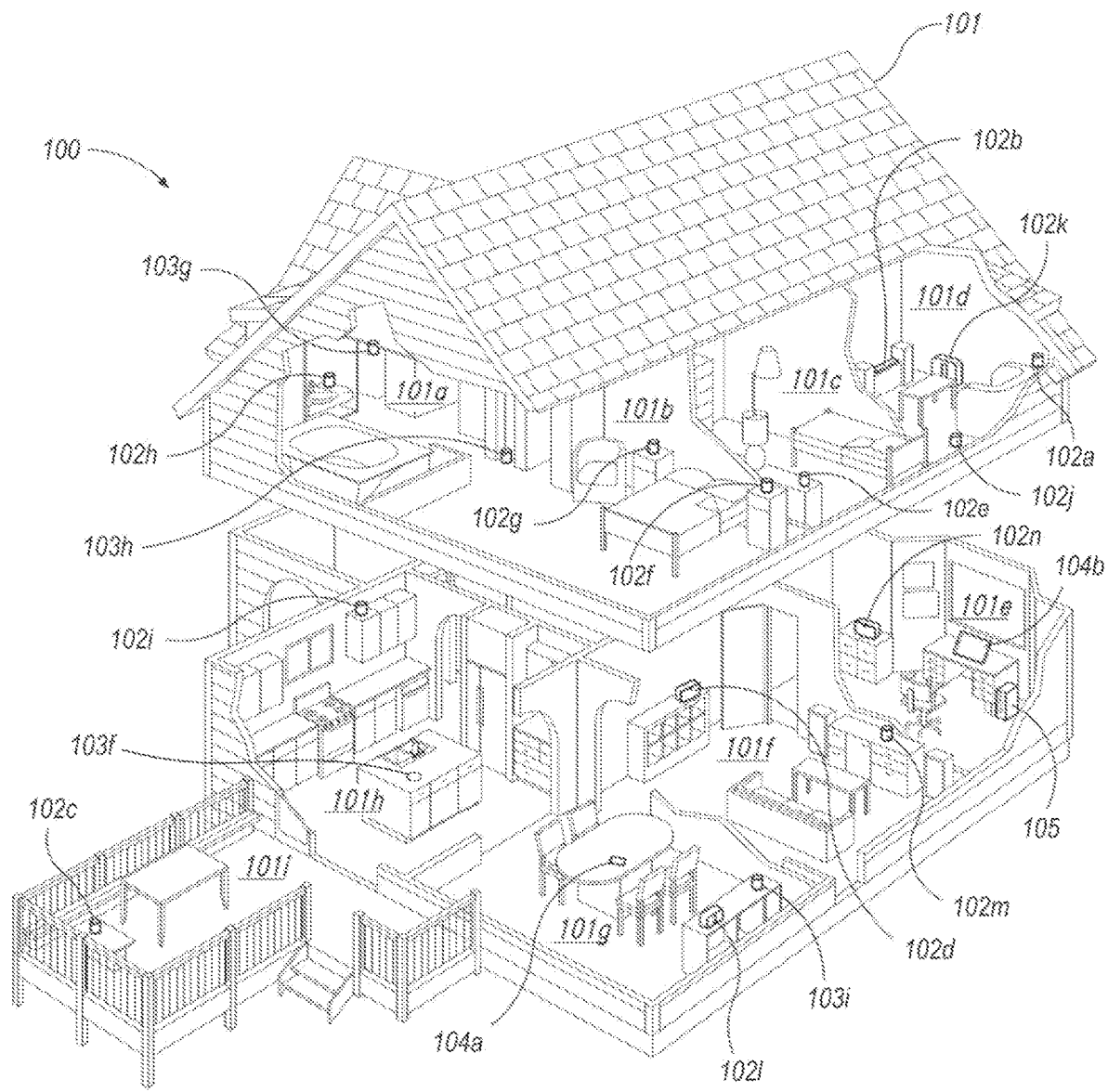
FIG. 1A is a partial cutaway view of an environment having a media playback system configured in accordance with aspects of the disclosed technology.

Example techniques described herein involve playback devices configured to detect changes in their environment thereby to enable one or more actions to be undertaken. The playback devices may include a plurality of different components, such as sensors and microphones, each of which may be configured to enable the detection of different changes in the environment. The actions include adjusting volume and/or adjusting a keyword detection threshold. The changes in environment include at least one of proximity of one or more people and detected sound.

By determining changes in the environment, the behavior of the playback device may be adjusted to suit the environment. For example, volume may be increased so audio output can be heard more easily, or reduced so that audio output does not hinder conversation in the room: the environmental changes can indicate an appropriate action, increasing the volume for general background noise and reducing volume for detected background speech. In other examples, determining changes in the environment can be used to adjust a keyword or Voice Assistant Service ("VAS) wakeword detection threshold, helping to reduce false positives and improve detection rates. For example, the detection threshold may be increased in the presence of noise, such as noise classified as background speech, to reduce false positives. Similarly, the detection threshold may be decreased when the environmental changes indicate that a voice command is likely, as when a person is determined to be in proximity and/or moving closer to the playback device.

According to a first aspect of the present invention there is provided a playback device comprising: at least one speaker; at least one processor; and data storage having instructions stored thereon that are executed by the at least one processor to cause the playback device to perform functions comprising: receiving an input representing one or more environmental characteristics of a real-world environment; determining at least one change in the one or more environmental characteristics, wherein the one or more environmental characteristics are representative of at least one of a proximity of at least one person to the playback device and a detected sound; and adjusting an output volume of the playback device based on the detected change in the one or more environmental characteristics. This enables changes in the environment of a playback device to be detected, and the output volume of the playback device to be modified and/or adjusted to improve the listening experience based on the changes in the environment. In general, after a determined environmental change volume may be increased to ensure users are able to clearly hear the output of the playback device, or decreased so that the audio output does not hinder other activities, such as conversation. The type of adjustment can be selected based on the determined change in the environmental characteristics.

For example, where a person, or group of people, are determined to be in close proximity and/or moving closer to the playback device the volume of the playback device may be decreased to avoid the volume being perceived as too loud. Similarly, when a sound input is classified as background noise, the volume may be increased so that the output can be heard more easily.

The playback device may further comprise at least one microphone, and the input may be an input sound data stream from the at least one microphone of the at least one playback device. The detecting a change in the one or more environmental characteristics comprises analyzing the input sound data stream. By analyzing the input sound data stream, volume can be adjusted depending on the environment. For example, an acoustic signature of the environment, such as the nature of any noises making up part of the input sound data stream, may be used to determine a change and adjustments made to the output of the playback device, such as increasing/decreasing the volume.

Determining a change in the one or more environmental characteristics may comprise classifying the input sound data stream as background speech; and the adjusting the output volume of the playback device comprises reducing or decreasing the volume.

Determining a change in the one or more environmental characteristics may comprise classifying the input sound data stream as background noise; and the adjusting the output volume of the playback device comprises increasing the volume.

In general, classifying the input sound data stream, such as being able to determine whether the input sound data stream comprises a background noise, enables relevant modifications to be made to the output volume. For example, if it is determined that the input sound data stream is representative of background noise, then the output of the playback device may be modified such as by increasing the playback volume. Conversely, if it is determined that the input sound data stream is representative of background speech, then the output volume may be decreased to further facilitate conversation between people in the environment.

The playback device may be one of a plurality of playback devices of a playback system, with the playback device further comprising a wireless network interface. The input may comprise wireless signal strength data of wireless signals received via the network interface from at least one other of the plurality of playback devices of the playback system and the determining a change in the one or more environmental characteristics comprises: determining a proximity of at least one person based on the wireless signal strength data. Wireless signal strength data can be indicative of presence because a person, or people, will interact with the wireless signals and change their relative strengths. In one example, proximity of a person may be indicated in a change in the relative signal strengths from the playback device to a first other playback device and a second other playback device. In another example, proximity of a person, or people, may be indicated by a change in wireless signal strength to another playback device over time. By determining the signal strength of wireless signals received by the playback device from other playback devices in the playback system, changes in the signal strength can be detected. These changes indicate physical changes in the real-world environment, such as users entering a given space. Such changes may then be used to indicate adjustments or alterations to the output volume.

The wireless signal strength data may be channel state information and/or received signal strength indication (RSSI). A number of characteristics of the wireless signal may be used to indicate the presence of a user within a given space, including channel state information and RSSI, because a user presence will interfere with the signals and change their received characteristics. Channel state information and RSSI are readily available for inspection by a receiving device, for example they can be provided from by a wireless network interface of the playback device.

The playback device may be part of a playback system comprising a plurality of other playback devices, and wherein adjusting the output volume further comprises transmitting a volume adjustment command to at least one of the plurality of other playback devices. This enables any adjustments to the output volume to be reflected in other playback devices in the playback system. For example, other playback devices in the same playback group and/or zone as the playback device may have their output volume adjusted.

The input may comprise a signal received from a portable device; and the determining at least one change in the one or more environmental characteristics then comprises determining a proximity of at least one person based on the signal. Here, a portable device is used to indicate the position of a person so that proximity can be determined. The portable device may be a controller device, such as a personal mobile device. Such devices are usually carried in person so can be taken to be indication of a person's location and use to determine their proximity. Other portable devices, such as a portable playback device, may only be indicative of a person's location occasionally, such as when they are determined to be moving (by a change in the position or perhaps by an accelerometer in the device detecting movement).

The determining at least one change in the one or more environmental characteristics may comprise determining a proximity of a single person to the playback device and a detected sound. When both these are determined, the adjusting the output volume of the playback device comprises increasing the output volume. "Determining a proximity" is used to mean that a person is considered to be close to the playback device, such as within a predetermined threshold distance from the device. For example, a person may be within 5 m, within 4 m, within 3 m, within 2 m or within 1 m from the device. By increasing the output volume when a sound is detected and a single person is in the vicinity of the playback device, the volume may be increased to compensate for the increase in environmental sound, thereby improving the listening experience. For example, the detected sound may be classified as background noise.

The determining at least one change in the one or more environmental characteristics may comprise determining a proximity of at least two people to the playback device and a detected sound. When both these are determined, the adjusting the output volume of the playback device comprises decreasing the output volume. "Determining a proximity" is used to mean that people are considered to be close to the playback device, such as within a predetermined threshold distance from the device. For example, at least one of the people may be within 5 m, within 4 m, within 3 m, within 2 m or within 1 m from the device. By reducing or decreasing the output volume, a conversation between the people is less likely to be hindered by the audio output. In some examples, the adjusting the volume may comprise decreasing the output volume when the detected sound is classified as 'speech-like' and/or "background speech". For example, if two people are in the proximity of the playback device and a non-'speech-like' sound is detected then reducing or decreasing the output volume might be undesirable, potentially making the audio output harder to hear in presence of general background noise, such as a dishwasher making noise in operation. However, if 'speech-like' sound is detected in combination with the presence of at least two people, it is more likely that a conversation between the two people is occurring, and therefore reducing or decreasing the output volume will improve the user experience by facilitating the conversation. Some examples may further require that the detected sound is detected for at least a predetermined period before taking any action. The predetermined period may be at least thirty seconds, at least one minute, at least two minutes, or at least five minutes. Applying a predetermined period can reduce false positives and reduce short term fluctuations in the output volume.

According to a second aspect of the present invention, there is provided a method performed by a playback device, comprising: receiving an input representing one or more environmental characteristics of a real-world environment; determining at least one change in the one or more environmental characteristics, wherein the one or more environmental characteristics are representative of at least one of a proximity of at least one person to a playback device and a detected sound; and adjusting an output volume of the playback device based on the detected change in the one or more environmental characteristics. This enables changes in the environment of a playback device to be detected, and the output volume of the playback device to be modified and/or adjusted to ensure an optimal listening environment based on the changes in the environment. By detecting any of the proximity of at least one person to the playback device, and a sound input, the output volume may be adjusted depending on the changes in the environment. For example, where a person, or people, are in close proximity to the playback device, this may be detected, and the volume of the playback device may be adjusted. It will be appreciated that this method can include one or more of the features described above for the first aspect.

According to a third aspect of the present invention, there is provided a playback device comprising: at least one speaker; at least one processor; and data storage having instructions stored thereon that are executed by the at least one processor to cause the playback device to perform functions comprising: receiving an input representing one or more environmental characteristics of a real-world environment; determining at least one change in the one or more environmental characteristics, wherein the one or more environmental characteristics are representative of at least one of a proximity of at least one person to the playback device and a detected sound; and adjusting a keyword detection threshold based on the detected change in the one or more environmental characteristics. This enables changes in the environment of a playback device to be detected, and the keyword detection threshold of the playback device to be modified and/or adjusted to improve the likelihood of detection of keyword utterances by people in the environment and/or reducing false positive detections. For example, where a person, or group of people, are in close proximity to the playback device, this may be detected, and the keyword detection threshold may be adjusted. Similarly, when background noise is detected the keyword detection threshold may be decreased to improve the likelihood of a user's keyword utterances being detected.

The playback device may comprise at least one microphone and the input may be an input sound data stream from the least one microphone; and the determining a change in the one or more environmental characteristics may comprise analyzing the input sound data stream. By analyzing the input sound data stream the keyword detection threshold may be adjusted. For example, an acoustic signature of the environment such as noises making up part of the input sound data stream may be detected, the type of sound classified and relevant adjustments may be made to the keyword detection threshold.

The determining a change in the one or more environmental characteristics may comprise: classifying the input sound data stream and adjusting the keyword detection threshold based on the classified input sound data stream. Classifying an input sound data stream, such as being able to determine whether the input sound data stream comprises or is representative of a background noise, and to distinguish between background noise from background speech enables relevant modifications to be made to the keyword detection threshold.

In one example, if the classified input sound data stream is representative of background noise, and a volume represented by the input sound data stream is increasing, then the keyword detection threshold may be decreased to more readily pick up utterances of any keywords against the greater background noise.

In another example, the keyword detection threshold may be increased when the classified noise is representative of background speech. This suggests that a conversation is occurring, so the keyword detection threshold is increased because it is less likely that keyword utterances would be intended during speech or conversation. It will be appreciated that background speech may involve a single speaker (such as during a telephone conversation) or two or more speakers. Some examples may also distinguish between far-field speech and speech output by the playback device itself, such as an audiobook or talk radio.

The analyzing the input sound data stream may comprise determining that the input sound data stream comprises at least one supported keyword of the playback device; and the adjusting comprises decreasing the keyword detection threshold. This can increase the likelihood of detecting any subsequent keywords. The decrease to the keyword detection threshold may be for a predefined duration, such as 10 seconds, 5 seconds, or 2 seconds to reduce the likelihood of false positives in keywords which were not intended to follow the supported keyword. The predefined duration may be reset for every supported keyword detected, so that the decreased keyword detection threshold can adapt to commands comprising different numbers of keywords. Some examples may also decrease the volume of the playback device to enable subsequent command keywords to be detected more easily.

When the one or more environmental characteristics include a proximity of at least one person, and the keyword detection threshold may be decreased when it determined that at least one person has moved closer to the playback device. Moving closer may be determined as a change in the position directly or a by determining that a person is when a threshold distance such as 2 m or 1 m of the playback device, when immediately previously no person was determined to be within the threshold distance. When it is determined that a person has moved closer to the playback device it is more likely that they wish to interact with the device, so reducing the keyword detection threshold can facilitate their interaction with the playback device by voice and reduce missed voice commands.

Determining the proximity of a person may use changes in received wireless signals from other devices. The playback device further comprises a wireless network interface and the input comprises wireless signal strength data of wireless signals received via the network interface from at least one other of a plurality of playback devices in the playback system. The determining a change in the one or more environmental characteristics comprises: determining a proximity of at least one person based on the wireless signal strength data. This enables changes in the position of users and/or other objects of the real-world environment to be determined based on the changes in the wireless signal received at the playback device from other playback devices of the playback system as representing a proximity of a person or people.

The keyword detection threshold may be adjusted based on the determined proximity of the at least one person, such that when a difference in the wireless signal received a second later time than a first time indicates that the at least one person is closer to the playback device, the keyword detection threshold is decreased. Voice commands may then be more easily detected.

In some examples, the one or more environmental characteristics are representative of both a proximity of at least one person to the playback device and a detected sound. The determining at least one change in the one or more environmental characteristics may comprise determining that at least one person is near the playback device and the detected sound is representative of background speech. In that case the adjusting the keyword detection threshold comprises increasing the keyword detection threshold.

According to a fourth aspect of the present invention, there is provided a method performed by a playback device, comprising: receiving an input representing one or more environmental characteristics of a real-world environment; determining at least one change in the one or more environmental characteristics, wherein the one or more environmental characteristics are representative of at least one of a proximity of at least one person to the playback device and a detected sound; adjusting a keyword detection threshold based on the detected change in the one or more environmental characteristics. This enables changes in the environment of a playback device to be detected, and the keyword detection threshold of the playback device to be modified and/or adjusted to improve detection of keyword utterances by people in the environment, reducing false positive detections and missed detections. Any of the features discussed above for the third aspect can equally be applied to the fourth aspect The features of the above described aspects may be combined, with a determined change in the environmental characteristics causing an adjustment of volume and a keyword detection threshold. For example:
   determining that a detected sound is classified as background speech may result in both a reduction in volume and an increase in the keyword detection threshold. Together these combine to provide an improved audio experience by reducing the intrusion from on the speech from output audio and from false positive keywords detected in the speech.
   determining that at least one person is in proximity to the playback device may result in a reduction in volume and a decrease in the keyword detection threshold.
Other combinations are possible.

A non-transitory computer readable medium may be provided having instructions stored thereon that can be executed by at least one processor of a playback device to cause the playback device to perform functions according to the above described aspects.

While some embodiments described herein may refer to functions performed by given actors, such as "users" and/or other entities, it should be understood that this description is for purposes of explanation only. The claims should not be interpreted to require action by any such example actor unless explicitly required by the language of the claims themselves.

Moreover, some functions are described herein as being performed "based on" or "in response to" another element or function. "Based on" should be understood that one element or function is related to another function or element. "In response to" should be understood that one element or function is a necessary result of another function or element. For the sake of brevity, functions are generally described as being based on another function when a functional link exists; however, such disclosure should be understood as disclosing either type of functional relationship.

II. Example Operation Environment

Figure 1B:
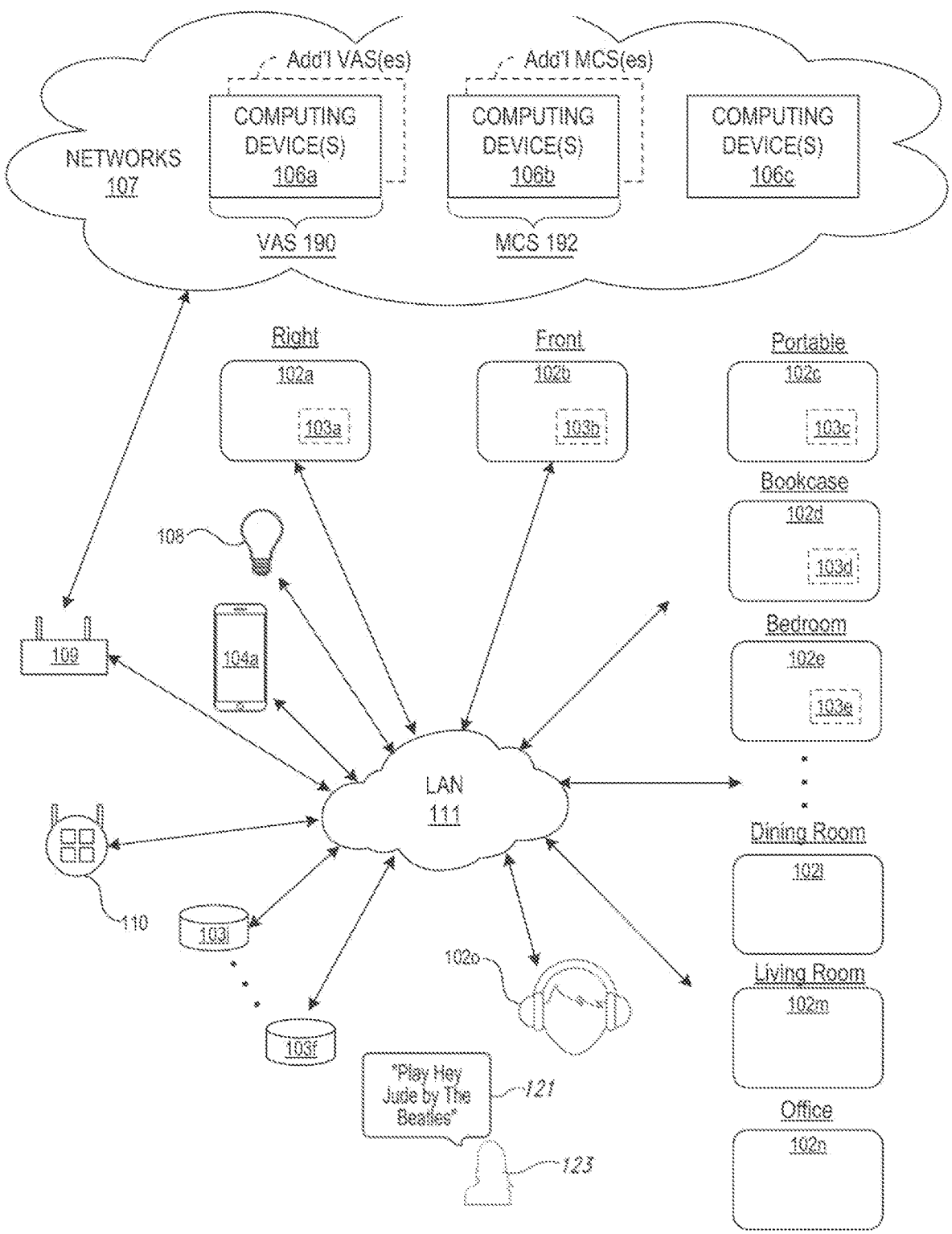
FIG. 1B is a schematic diagram of the media playback system of FIG. 1A and one or more networks.

FIGS. 1A and 1B illustrate an example configuration of a media playback system 100 (or "MPS 100") in which one or more embodiments disclosed herein may be implemented. Referring first to FIG. 1A, the MPS 100 as shown is associated with an example home environment having a plurality of rooms and spaces, which may be collectively referred to as a "home environment," "smart home," or "environment 101." The environment 101 comprises a household having several rooms, spaces, and/or playback zones, including a master bathroom 101*a*, a master bedroom 101*b*, (referred to herein as "Nick's Room"), a second bedroom 101*c*, a family room or den 101*d*, an office 101*e*, a living room 101*f*, a dining room 101*g*, a kitchen 101*h*, and an outdoor patio 101*i*. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

Within these rooms and spaces, the MPS 100 includes one or more computing devices. Referring to FIGS. 1A and 1B together, such computing devices can include playback devices 102 (identified individually as playback devices 102a-102o), network microphone devices 103 (identified individually as "NMDs" 103a-102i), and controller devices 104a and 104b (collectively "controller devices 104"). Referring to FIG. 1B, the home environment may include additional and/or other computing devices, including local network devices, such as one or more smart illumination devices 108 (FIG. 1B), a smart thermostat 110, and a local computing device 105 (FIG. 1A). In embodiments described below, one or more of the various playback devices 102 may be configured as portable playback devices, while others may be configured as stationary playback devices. For example, the headphones 102o (FIG. 1B) are a portable playback device, while the playback device 102d on the bookcase may be a stationary device. As another example, the playback device 102c on the Patio may be a battery-powered device, which may allow it to be transported to various areas within the environment 101, and outside of the environment 101, when it is not plugged in to a wall outlet or the like.

With reference still to FIG. 1B, the various playback, network microphone, and controller devices 102, 103, and 104 and/or other network devices of the MPS 100 may be coupled to one another via point-to-point connections and/or over other connections, which may be wired and/or wireless, via a network 111, such as a LAN including a network router 109. For example, the playback device 102j in the Den 101d (FIG. 1A), which may be designated as the "Left" device, may have a point-to-point connection with the playback device 102a, which is also in the Den 101d and may be designated as the "Right" device. In a related embodiment, the Left playback device 102j may communicate with other network devices, such as the playback device 102b, which may be designated as the "Front" device, via a point-to-point connection and/or other connections via the NETWORK 111.

As further shown in FIG. 1B, the MPS 100 may be coupled to one or more remote computing devices 106 via a wide area network ("WAN") 107. In some embodiments, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the home environment 101.

In some implementations, the various playback devices, NMDs, and/or controller devices 102-104 may be communicatively coupled to at least one remote computing device associated with a VAS and at least one remote computing device associated with a media content service ("MCS"). For instance, in the illustrated example of FIG. 1B, remote computing devices 106 are associated with a VAS 190 and remote computing devices 106b are associated with an MCS 192. Although only a single VAS 190 and a single MCS 192 are shown in the example of FIG. 1B for purposes of clarity, the MPS 100 may be coupled to multiple, different VASes and/or MCSes. In some implementations, VASes may be operated by one or more of AMAZON, GOOGLE, APPLE, MICROSOFT, SONOS or other voice assistant providers. In some implementations, MCSes may be operated by one or more of SPOTIFY, PANDORA, AMAZON MUSIC, or other media content services.

As further shown in FIG. 1B, the remote computing devices 106 further include remote computing device 106c configured to perform certain operations, such as remotely facilitating media playback functions, managing device and system status information, directing communications between the devices of the MPS 100 and one or multiple VASes and/or MCSes, among other operations. In one example, the remote computing devices 106c provide cloud servers for one or more SONOS Wireless HiFi Systems.

In various implementations, one or more of the playback devices 102 may take the form of or include an on-board (e.g., integrated) network microphone device. For example, the playback devices 102a—e include or are otherwise equipped with corresponding NMDs 103a—e, respectively. A playback device that includes or is equipped with an NMD may be referred to herein interchangeably as a playback device or an NMD unless indicated otherwise in the description. In some cases, one or more of the NMDs 103 may be a stand-alone device. For example, the NMDs 103f and 103g may be stand-alone devices. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 102 and 103 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 102d because it is physically situated on a bookcase. Similarly, the NMD 103f may be assigned the named "Island" because it is physically situated on an island countertop in the Kitchen 101h (FIG. 1A). Some playback devices may be assigned names according to a zone or room, such as the playback devices 102e, 102l, 102m, and 102n, which are named "Bedroom," "Dining Room," "Living Room," and "Office," respectively. Further, certain playback devices may have functionally descriptive names. For example, the playback devices 102a and 102b are assigned the names "Right" and "Front," respectively, because these two devices are configured to provide specific audio channels during media playback in the zone of the Den 101d (FIG. 1A). The playback device 102c in the Patio may be named portable because it is battery-powered and/or readily transportable to different areas of the environment 101. Other naming conventions are possible.

As discussed above, an NMD may detect and process sound from its environment, such as sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word associated with a particular VAS.

In the illustrated example of FIG. 1B, the NMDs 103 are configured to interact with the VAS 190 over a network via the network 111 and the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 102-105 (FIG. 1A) and/or remote computing devices 106c of the MPS 100 may exchange various feedback, information, instructions, and/or related data with the remote computing devices associated with the selected VAS. Such exchanges may be related to or independent of transmitted messages containing voice inputs. In some embodiments, the remote computing device(s) and the MPS 100 may exchange data via communication paths as described herein and/or using a metadata exchange channel as described in U.S. application Ser. No. 15/438,749 filed Feb. 21, 2017, and titled "Voice Control of a Media Playback System," which is herein incorporated by reference in its entirety.

Upon receiving the stream of sound data, the VAS 190 determines if there is voice input in the streamed data from the NMD, and if so the VAS 190 will also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude." After these determinations, the VAS 190 may transmit a command to a particular MCS 192 to retrieve content (i.e., the song "Hey Jude"), and that MCS 192, in turn, provides (e.g., streams) this content directly to the MPS 100 or indirectly via the VAS 190. In some implementations, the VAS 190 may transmit to the MPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 102d in the environment 101 (FIG. 1A) is in relatively close proximity to the NMD-equipped Living Room playback device 102m, and both devices 102d and 102m may at least sometimes detect the same sound. In such cases, this may require arbitration as to which device is ultimately responsible for providing detected-sound data to the remote VAS. Examples of arbitrating between NMDs may be found, for example, in previously referenced U.S. application Ser. No. 15/438,749.

In certain implementations, an NMD may be assigned to, or otherwise associated with, a designated or default playback device that may not include an NMD. For example, the Island NMD 103f in the Kitchen 101h (FIG. 1A) may be assigned to the Dining Room playback device 102l, which is in relatively close proximity to the Island NMD 103f. In practice, an NMD may direct an assigned playback device to play audio in response to a remote VAS receiving a voice input from the NMD to play the audio, which the NMD might have sent to the VAS in response to a user speaking a command to play a certain song, album, playlist, etc.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback, network microphone, and/or controller devices 102-104. For example, the technologies herein may be utilized within an environment having a single playback device 102 and/or a single NMD 103. In some examples of such cases, the NETWORK 111 (FIG. 1B) may be eliminated and the single playback device 102 and/or the single NMD 103 may communicate directly with the remote computing devices 106—d. In some embodiments, a telecommunication network (e.g., an LTE network, a 5G network, etc.) may communicate with the various playback, network microphone, and/or controller devices 102-104 independent of a LAN.

a. Example Playback & Network Microphone Devices

Figure 2A:
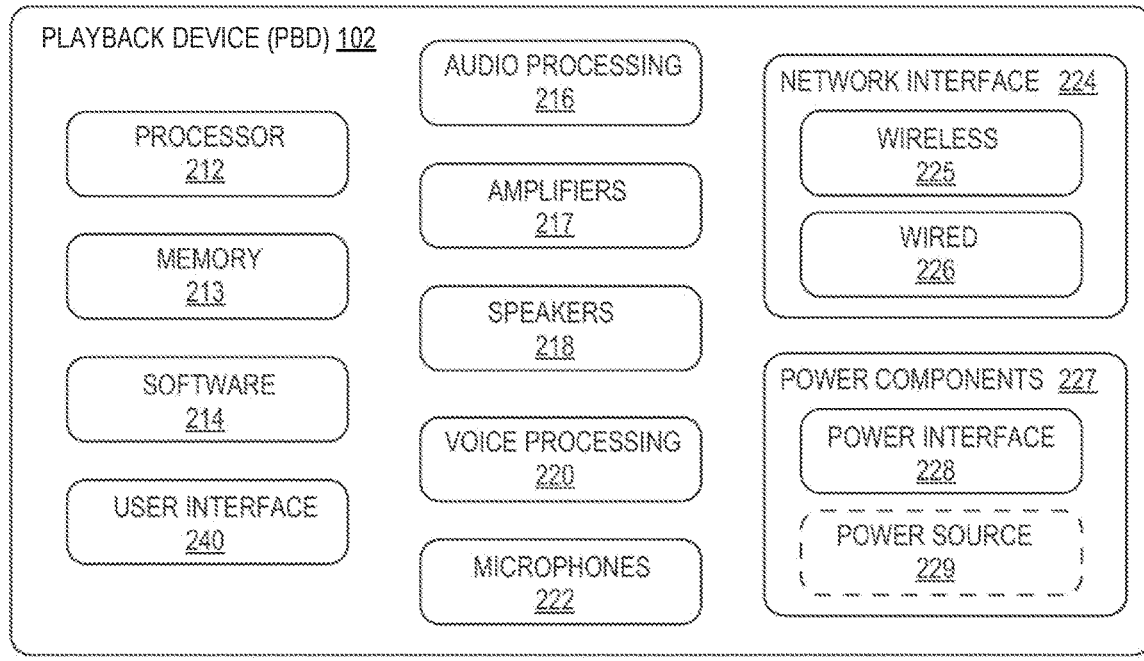
FIG. 2A is a functional block diagram of an example playback device.

FIG. 2A is a functional block diagram illustrating certain aspects of one of the playback devices 102 of the MPS 100 of FIGS. 1A and 1B. As shown, the playback device 102 includes various components, each of which is discussed in further detail below, and the various components of the playback device 102 may be operably coupled to one another via a system bus, communication network, or some other connection mechanism. In the illustrated example of FIG. 2A, the playback device 102 may be referred to as an "NMD-equipped" playback device because it includes components that support the functionality of an NMD, such as one of the NMDs 103 shown in FIG. 1A.

As shown, the playback device 102 includes at least one processor 212, which may be a clock-driven computing component configured to process input data according to instructions stored in memory 213. The memory 213 may be a tangible, non-transitory, computer-readable medium configured to store instructions that are executable by the processor 212. For example, the memory 213 may be data storage that can be loaded with software code 214 that is executable by the processor 212 to achieve certain functions.

In one example, these functions may involve the playback device 102 retrieving audio data from an audio source, which may be another playback device. In another example, the functions may involve the playback device 102 sending audio data, detected-sound data (e.g., corresponding to a voice input), and/or other information to another device on a network via at least one network interface 224. In yet another example, the functions may involve the playback device 102 causing one or more other playback devices to synchronously playback audio with the playback device 102. In yet a further example, the functions may involve the playback device 102 facilitating being paired or otherwise bonded with one or more other playback devices to create a multi-channel audio environment. Numerous other example functions are possible, some of which are discussed below.

As just mentioned, certain functions may involve the playback device 102 synchronizing playback of audio content with one or more other playback devices. During synchronous playback, a listener may not perceive time-delay differences between playback of the audio content by the synchronized playback devices. U.S. Pat. No. 8,234,395 filed on Apr. 4, 2004, and titled "System and method for synchronizing operations among a plurality of independently clocked digital data processing devices," which is hereby incorporated by reference in its entirety, provides in more detail some examples for audio playback synchronization among playback devices.

To facilitate audio playback, the playback device 102 includes audio processing components 216 that are generally configured to process audio prior to the playback device 102 rendering the audio. In this respect, the audio processing components 216 may include one or more digital-to-analog converters ("DAC"), one or more audio preprocessing components, one or more audio enhancement components, one or more digital signal processors ("DSPs"), and so on. In some implementations, one or more of the audio processing components 216 may be a subcomponent of the processor 212. In operation, the audio processing components 216 receive analog and/or digital audio and process and/or otherwise intentionally alter the audio to produce audio signals for playback.

The produced audio signals may then be provided to one or more audio amplifiers 217 for amplification and playback through one or more speakers 218 operably coupled to the amplifiers 217. The audio amplifiers 217 may include components configured to amplify audio signals to a level for driving one or more of the speakers 218.

Each of the speakers 218 may include an individual transducer (e.g., a "driver") or the speakers 218 may include a complete speaker system involving an enclosure with one or more drivers. A particular driver of a speaker 218 may include, for example, a subwoofer (e.g., for low frequencies), a mid-range driver (e.g., for middle frequencies), and/or a tweeter (e.g., for high frequencies). In some cases, a transducer may be driven by an individual corresponding audio amplifier of the audio amplifiers 217. In some implementations, a playback device may not include the speakers 218, but instead may include a speaker interface for connecting the playback device to external speakers. In certain embodiments, a playback device may include neither the speakers 218 nor the audio amplifiers 217, but instead may include an audio interface (not shown) for connecting the playback device to an external audio amplifier or audio-visual receiver.

In addition to producing audio signals for playback by the playback device 102, the audio processing components 216 may be configured to process audio to be sent to one or more other playback devices, via the network interface 224, for playback. In example scenarios, audio content to be processed and/or played back by the playback device 102 may be received from an external source, such as via an audio line-in interface (e.g., an auto-detecting 3.5 mm audio line-in connection) of the playback device 102 (not shown) or via the network interface 224, as described below.

As shown, the at least one network interface 224, may take the form of one or more wireless interfaces 225 and/or one or more wired interfaces 226. A wireless interface may provide network interface functions for the playback device 102 to wirelessly communicate with other devices (e.g., other playback device(s), NMD(s), and/or controller device(s)) in accordance with a communication protocol (e.g., any wireless standard including IEEE 802.11a, 802.11b, 802.11g, 802.11n, 802.11ac, 802.15, 4G mobile communication standard, and so on). A wired interface may provide network interface functions for the playback device 102 to communicate over a wired connection with other devices in accordance with a communication protocol (e.g., IEEE 802.3). While the network interface 224 shown in FIG. 2A include both wired and wireless interfaces, the playback device 102 may in some implementations include only wireless interface(s) or only wired interface(s).

In general, the network interface 224 facilitates data flow between the playback device 102 and one or more other devices on a data network. For instance, the playback device 102 may be configured to receive audio content over the data network from one or more other playback devices, network devices within a LAN, and/or audio content sources over a WAN, such as the Internet. In one example, the audio content and other signals transmitted and received by the playback device 102 may be transmitted in the form of digital packet data comprising an Internet Protocol (IP)-based source address and IP-based destination addresses. In such a case, the network interface 224 may be configured to parse the digital packet data such that the data destined for the playback device 102 is properly received and processed by the playback device 102.

As shown in FIG. 2A, the playback device 102 also includes voice processing components 220 that are operably coupled to one or more microphones 222. The microphones 222 are configured to detect sound (i.e., acoustic waves) in the environment of the playback device 102, which is then provided to the voice processing components 220. More specifically, each microphone 222 is configured to detect sound and convert the sound into a digital or analog signal representative of the detected sound, which can then cause the voice processing component 220 to perform various functions based on the detected sound, as described in greater detail below. In one implementation, the microphones 222 are arranged as an array of microphones (e.g., an array of six microphones). In some implementations, the playback device 102 includes more than six microphones (e.g., eight microphones or twelve microphones) or fewer than six microphones (e.g., four microphones, two microphones, or a single microphones).

In operation, the voice-processing components 220 are generally configured to detect and process sound received via the microphones 222, identify potential voice input in the detected sound, and extract detected-sound data to enable a VAS, such as the VAS 190 (FIG. 1B), to process voice input identified in the detected-sound data. The voice processing components 220 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 220 may include or otherwise take the form of one or more DSPs or one or more modules of a DSP. In this respect, certain voice processing components 220 may be configured with particular parameters (e.g., gain and/or spectral parameters) that may be modified or otherwise tuned to achieve particular functions. In some implementations, one or more of the voice processing components 220 may be a subcomponent of the processor 212.

As further shown in FIG. 2A, the playback device 102 also includes power components 227. The power components 227 include at least an external power source interface 228, which may be coupled to a power source (not shown) via a power cable or the like that physically connects the playback device 102 to an electrical outlet or some other external power source. Other power components may include, for example, transformers, converters, and like components configured to format electrical power.

In some implementations, the power components 227 of the playback device 102 may additionally include an internal power source 229 (e.g., one or more batteries) configured to power the playback device 102 without a physical connection to an external power source. When equipped with the internal power source 229, the playback device 102 may operate independent of an external power source. In some such implementations, the external power source interface 228 may be configured to facilitate charging the internal power source 229. As discussed before, a playback device comprising an internal power source may be referred to herein as a "portable playback device." On the other hand, a playback device that operates using an external power source may be referred to herein as a "stationary playback device," although such a device may in fact be moved around a home or other environment.

The playback device 102 further includes a user interface 240 that may facilitate user interactions independent of or in conjunction with user interactions facilitated by one or more of the controller devices 104. In various embodiments, the user interface 240 includes one or more physical buttons and/or supports graphical interfaces provided on touch sensitive screen(s) and/or surface(s), among other possibilities, for a user to directly provide input. The user interface 240 may further include one or more of lights (e.g., LEDs) and the speakers to provide visual and/or audio feedback to a user.

Figure 2B:
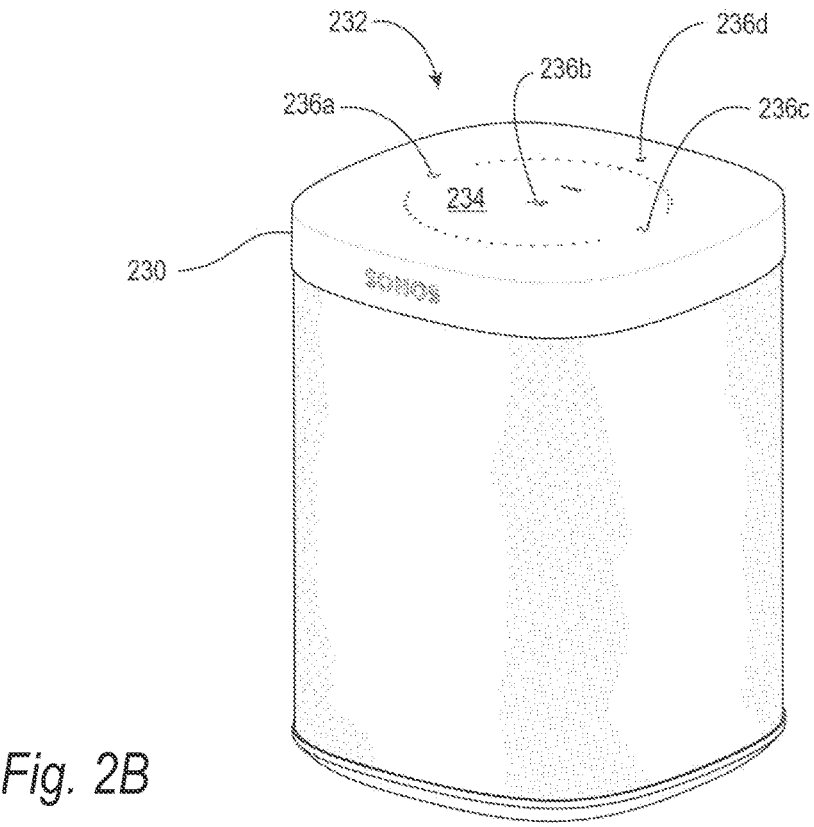
FIG. 2B is an isometric diagram of an example housing of the playback device of FIG. 2A.

As an illustrative example, FIG. 2B shows an example housing 230 of the playback device 102 that includes a user interface in the form of a control area 232 at a top portion 234 of the housing 230. The control area 232 includes buttons 236*a-c* for controlling audio playback, volume level, and other functions. The control area 232 also includes a button 236*d* for toggling the microphones 222 to either an on state or an off state.

As further shown in FIG. 2B, the control area 232 is at least partially surrounded by apertures formed in the top portion 234 of the housing 230 through which the microphones 222 (not visible in FIG. 2B) receive the sound in the environment of the playback device 102. The microphones 222 may be arranged in various positions along and/or within the top portion 234 or other areas of the housing 230 so as to detect sound from one or more directions relative to the playback device 102.

By way of illustration, SONOS, Inc. presently offers (or has offered) for sale certain playback devices that may implement certain of the embodiments disclosed herein, including a "PLAY:1," "PLAY:3," "PLAY:5," "PLAYBAR," "CONNECT: AMP," "PLAYBASE," "BEAM," "CONNECT," and "SUB." Any other past, present, and/or future playback devices may additionally or alternatively be used to implement the playback devices of example embodiments disclosed herein. Additionally, it should be understood that a playback device is not limited to the examples illustrated in FIG. 2A or 2B or to the SONOS product offerings. For example, a playback device may include, or otherwise take the form of, a wired or wireless headphone set, which may operate as a part of the MPS 100 via a network interface or the like. In another example, a playback device may include or interact with a docking station for personal mobile media playback devices. In yet another example, a playback device may be integral to another device or component such as a television, a lighting fixture, or some other device for indoor or outdoor use.

Figure 2C:
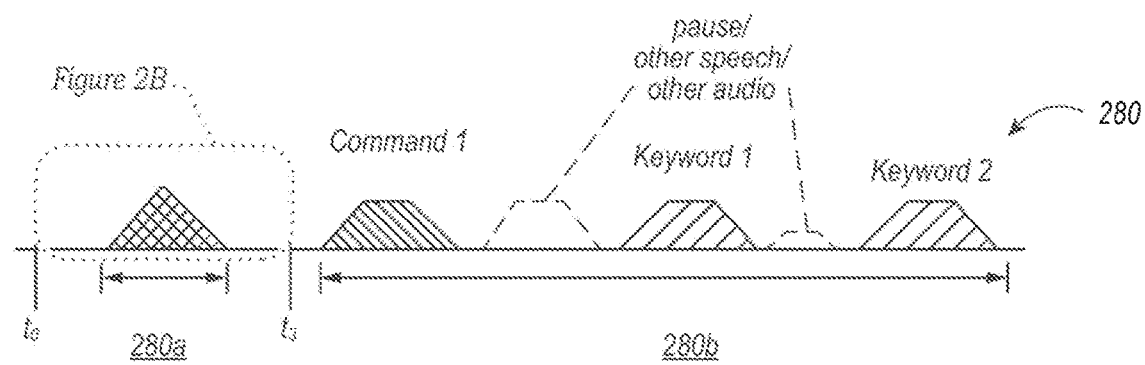
FIG. 2C is a diagram of an example voice input.

FIG. 2C is a diagram of an example voice input 280 that may be processed by an NMD or an NMD-equipped playback device. The voice input 280 may include a keyword portion 280*a* and an utterance portion 280*b*. The keyword portion 280*a* may include a wake word or a command keyword. In the case of a wake word, the keyword portion 280*a* corresponds to detected sound that caused a wake-word The utterance portion 280*b* corresponds to detected sound that potentially comprises a user request following the keyword portion 280*a*. An utterance portion 280*b* can be processed to identify the presence of any words in detected-sound data by the NMD in response to the event caused by the keyword portion 280*a*. In various implementations, an underlying intent can be determined based on the words in the utterance portion 280*b*. In certain implementations, an underlying intent can also be based or at least partially based on certain words in the keyword portion 280*a*, such as when keyword portion includes a command keyword. In any case, the words may correspond to one or more commands, as well as a certain command and certain keywords. A keyword in the voice utterance portion 280*b* may be, for example, a word identifying a particular device or group in the MPS 100. For instance, in the illustrated example, the keywords in the voice utterance portion 280*b* may be one or more words identifying one or more zones in which the music is to be played, such as the Living Room and the Dining Room (FIG. 1A). In some cases, the utterance portion 280*b* may include additional information, such as detected pauses (e.g., periods of non-speech) between words spoken by a user, as shown in FIG. 2C. The pauses may demarcate the locations of separate commands, keywords, or other information spoke by the user within the utterance portion 280*b*.

Based on certain command criteria, the NMD and/or a remote VAS may take actions as a result of identifying one or more commands in the voice input. Command criteria may be based on the inclusion of certain keywords within the voice input, among other possibilities. Additionally, or alternatively, command criteria for commands may involve identification of one or more control-state and/or zone-state variables in conjunction with identification of one or more particular commands. Control-state variables may include, for example, indicators identifying a level of volume, a queue associated with one or more devices, and playback state, such as whether devices are playing a queue, paused, etc. Zone-state variables may include, for example, indicators identifying which, if any, zone players are grouped.

In some implementations, the MPS 100 is configured to temporarily reduce the volume of audio content that it is playing upon detecting a certain keyword, such as a wake word, in the keyword portion 280*a*. The MPS 100 may restore the volume after processing the voice input 280. Such a process can be referred to as ducking, examples of which are disclosed in U.S. patent application Ser. No. 15/438,749, incorporated by reference herein in its entirety.

Figure 2D:
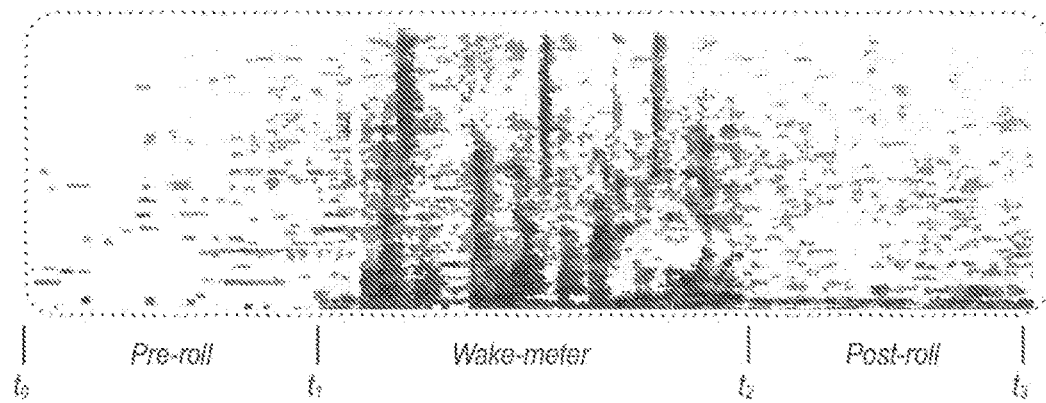
FIG. 2D is a graph depicting an example sound specimen in accordance with aspects of the disclosure.

FIG. 2D shows an example sound specimen. In this example, the sound specimen corresponds to the sound-data stream (e.g., one or more audio frames) associated with a spotted wake word or command keyword in the keyword portion 280*a* of FIG. 2A. As illustrated, the example sound specimen comprises sound detected in an NMD's environment (i) immediately before a wake or command word was spoken, which may be referred to as a pre-roll portion (between times $t_0$ and $t_1$), (ii) while a wake or command word was spoken, which may be referred to as a wake-meter portion (between times $t_1$ and $t_2$), and/or (iii) after the wake or command word was spoken, which may be referred to as a post-roll portion (between times $t_2$ and $t_3$). Other sound specimens are also possible. In various implementations, aspects of the sound specimen can be evaluated according to an acoustic model which aims to map mels/spectral features to phonemes in a given language model for further processing. For example, automatic speech recognition (ASR) may include such mapping for command-keyword detection. Wake-word detection engines, by contrast, may be precisely tuned to identify a specific wake-word, and a downstream action of invoking a VAS (e.g., by targeting only nonce words in the voice input processed by the playback device).

ASR for command keyword detection may be tuned to accommodate a wide range of keywords (e.g., 5, 10, 100, 1,000, 10,000 keywords). Command keyword detection, in contrast to wake-word detection, may involve feeding ASR output to an onboard, local NLU which together with the ASR determine when command word events have occurred. In some implementations described below, the local NLU may determine an intent based on one or more other keywords in the ASR output produced by a particular voice input. In these or other implementations, a playback device may act on a detected command keyword event only when the playback devices determines that certain conditions have been met, such as environmental conditions (e.g., low background noise).

b. Example Playback Device Configurations

Figure 3B:
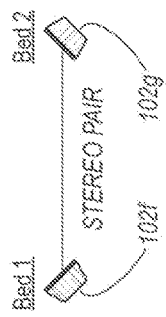
FIGS. 3A, 3B, 3C, 3D and 3E are diagrams showing example playback device configurations in accordance with aspects of the disclosure.
Figure 3C:
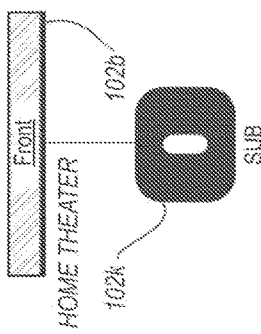
Figure 3D:
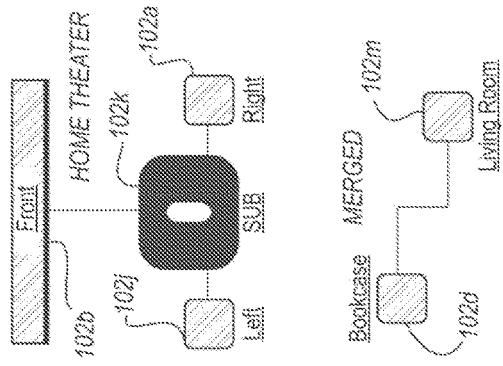
Figure 3E:
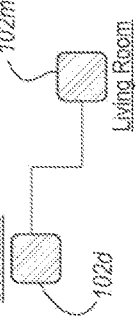
Figure 3A:
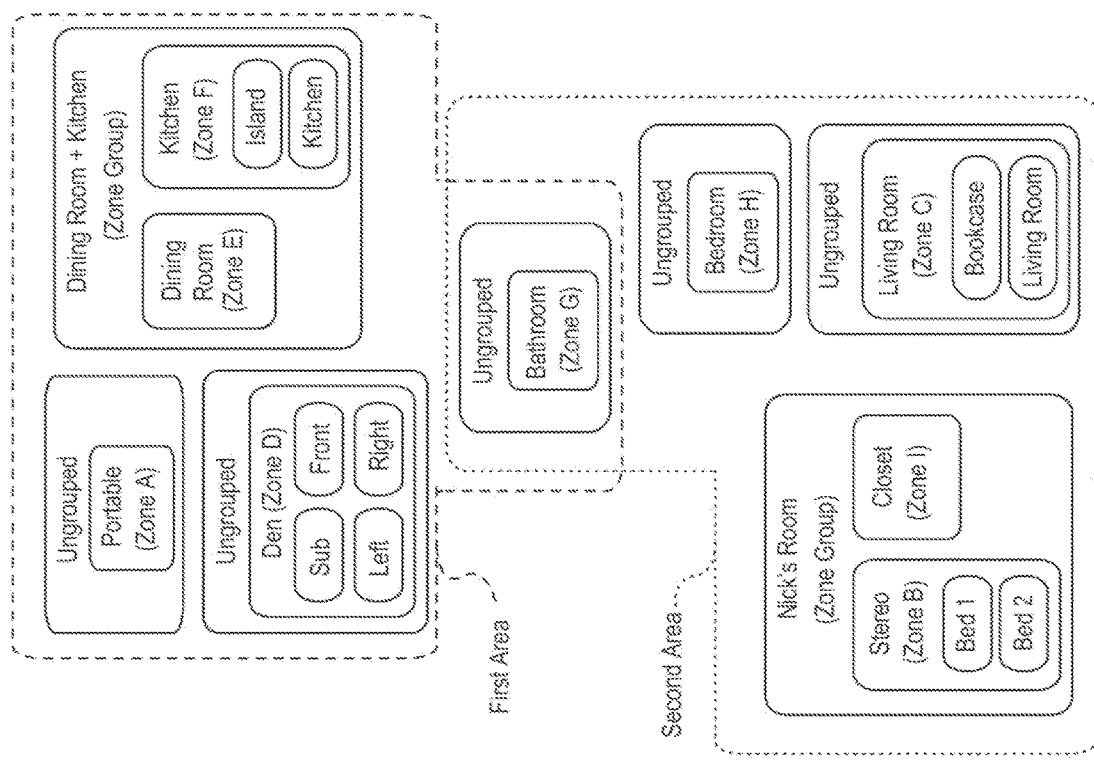

FIGS. 3A-3E show example configurations of playback devices. Referring first to FIG. 3A, in some example instances, a single playback device may belong to a zone. For example, the playback device 102c (FIG. 1A) on the Patio may belong to Zone A. In some implementations described below, multiple playback devices may be "bonded" to form a "bonded pair," which together form a single zone. For example, the playback device 102f (FIG. 1A) named "Bed 1" in FIG. 3A may be bonded to the playback device 102g (FIG. 1A) named "Bed 2" in FIG. 3A to form Zone B. Bonded playback devices may have different playback responsibilities (e.g., channel responsibilities). In another implementation described below, multiple playback devices may be merged to form a single zone. For example, the playback device 102d named "Bookcase" may be merged with the playback device 102m named "Living Room" to form a single Zone C. The merged playback devices 102d and 102m may not be specifically assigned different playback responsibilities. That is, the merged playback devices 102d and 102m may, aside from playing audio content in synchrony, each play audio content as they would if they were not merged.

For purposes of control, each zone in the MPS 100 may be represented as a single user interface ("UI") entity. For example, as displayed by the controller devices 104, Zone A may be provided as a single entity named "Portable," Zone B may be provided as a single entity named "Stereo," and Zone C may be provided as a single entity named "Living Room."

In various embodiments, a zone may take on the name of one of the playback devices belonging to the zone. For example, Zone C may take on the name of the Living Room device 102m (as shown). In another example, Zone C may instead take on the name of the Bookcase device 102d. In a further example, Zone C may take on a name that is some combination of the Bookcase device 102d and Living Room device 102m. The name that is chosen may be selected by a user via inputs at a controller device 104. In some embodiments, a zone may be given a name that is different than the device(s) belonging to the zone. For example, Zone B in FIG. 3A is named "Stereo" but none of the devices in Zone B have this name. In one aspect, Zone B is a single UI entity representing a single device named "Stereo," composed of constituent devices "Bed 1" and "Bed 2." In one implementation, the Bed 1 device may be playback device 102f in the master bedroom 101h (FIG. 1A) and the Bed 2 device may be the playback device 102g also in the master bedroom 101h (FIG. 1A).

As noted above, playback devices that are bonded may have different playback responsibilities, such as playback responsibilities for certain audio channels. For example, as shown in FIG. 3B, the Bed 1 and Bed 2 devices 102f and 102g may be bonded so as to produce or enhance a stereo effect of audio content. In this example, the Bed 1 playback device 102f may be configured to play a left channel audio component, while the Bed 2 playback device 102g may be configured to play a right channel audio component. In some implementations, such stereo bonding may be referred to as "pairing."

Additionally, playback devices that are configured to be bonded may have additional and/or different respective speaker drivers. As shown in FIG. 3C, the playback device 102b named "Front" may be bonded with the playback device 102k named "SUB." The Front device 102b may render a range of mid to high frequencies, and the SUB device 102k may render low frequencies as, for example, a subwoofer. When unbonded, the Front device 102b may be configured to render a full range of frequencies. As another example, FIG. 3D shows the Front and SUB devices 102b and 102k further bonded with Right and Left playback devices 102a and 102j, respectively. In some implementations, the Right and Left devices 102a and 102j may form surround or "satellite" channels of a home theater system. The bonded playback devices 102a, 102b, 102j, and 102k may form a single Zone D (FIG. 3A).

In some implementations, playback devices may also be "merged." In contrast to certain bonded playback devices, playback devices that are merged may not have assigned playback responsibilities, but may each render the full range of audio content that each respective playback device is capable of Nevertheless, merged devices may be represented as a single UI entity (i.e., a zone, as discussed above). For instance, FIG. 3E shows the playback devices 102d and 102m in the Living Room merged, which would result in these devices being represented by the single UI entity of Zone C. In one embodiment, the playback devices 102d and 102m may playback audio in synchrony, during which each outputs the full range of audio content that each respective playback device 102d and 102m is capable of rendering.

In some embodiments, a stand-alone NMD may be in a zone by itself. For example, the NMD 103h from FIG. 1A is named "Closet" and forms Zone I in FIG. 3A. An NMD may also be bonded or merged with another device so as to form a zone. For example, the NMD device 103f named "Island" may be bonded with the playback device 102i Kitchen, which together form Zone F, which is also named "Kitchen." Additional details regarding assigning NMDs and playback devices as designated or default devices may be found, for example, in previously referenced U.S. patent application Ser. No. 15/438,749. In some embodiments, a stand-alone NMD may not be assigned to a zone.

Zones of individual, bonded, and/or merged devices may be arranged to form a set of playback devices that playback audio in synchrony. Such a set of playback devices may be referred to as a "group," "zone group," "synchrony group," or "playback group." In response to inputs provided via a controller device 104, playback devices may be dynamically grouped and ungrouped to form new or different groups that synchronously play back audio content. For example, referring to FIG. 3A, Zone A may be grouped with Zone B to form a zone group that includes the playback devices of the two zones. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Grouped and bonded devices are example types of associations between portable and stationary playback devices that may be caused in response to a trigger event, as discussed above and described in greater detail below.

In various implementations, the zones in an environment may be assigned a particular name, which may be the default name of a zone within a zone group or a combination of the names of the zones within a zone group, such as "Dining Room+Kitchen," as shown in FIG. 3A. In some embodiments, a zone group may be given a unique name selected by a user, such as "Nick's Room," as also shown in FIG. 3A. The name "Nick's Room" may be a name chosen by a user over a prior name for the zone group, such as the room name "Master Bedroom."

Referring back to FIG. 2A, certain data may be stored in the memory 213 as one or more state variables that are periodically updated and used to describe the state of a playback zone, the playback device(s), and/or a zone group associated therewith. The memory 213 may also include the data associated with the state of the other devices of the MPS 100, which may be shared from time to time among the devices so that one or more of the devices have the most recent data associated with the system.

In some embodiments, the memory 213 of the playback device 102 may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, in FIG. 1A, identifiers associated with the Patio may indicate that the Patio is the only playback device of a particular zone and not in a zone group. Identifiers associated with the Living Room may indicate that the Living Room is not grouped with other zones but includes bonded playback devices 102a, 102b, 102j, and 102k. Identifiers associated with the Dining Room may indicate that the Dining Room is part of Dining Room+Kitchen group and that devices 103f and 102i are bonded. Identifiers associated with the Kitchen may indicate the same or similar information by virtue of the Kitchen being part of the Dining Room+Kitchen zone group. Other example zone variables and identifiers are described below.

In yet another example, the MPS 100 may include variables or identifiers representing other associations of zones and zone groups, such as identifiers associated with Areas, as shown in FIG. 3A. An Area may involve a cluster of zone groups and/or zones not within a zone group. For instance, FIG. 3A shows a first area named "First Area" and a second area named "Second Area." The First Area includes zones and zone groups of the Patio, Den, Dining Room, Kitchen, and Bathroom. The Second Area includes zones and zone groups of the Bathroom, Nick's Room, Bedroom, and Living Room. In one aspect, an Area may be used to invoke a cluster of zone groups and/or zones that share one or more zones and/or zone groups of another cluster. In this respect, such an Area differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the MPS 100 may not implement Areas, in which case the system may not store variables associated with Areas.

The memory 213 may be further configured to store other data. Such data may pertain to audio sources accessible by the playback device 102 or a playback queue that the playback device (or some other playback device(s)) may be associated with. In embodiments described below, the memory 213 is configured to store a set of command data for selecting a particular VAS when processing voice inputs. During operation, one or more playback zones in the environment of FIG. 1A may each be playing different audio content. For instance, the user may be grilling in the Patio zone and listening to hip hop music being played by the playback device 102c, while another user may be preparing food in the Kitchen zone and listening to classical music being played by the playback device 102i. In another example, a playback zone may play the same audio content in synchrony with another playback zone.

For instance, the user may be in the Office zone where the playback device 102n is playing the same hip-hop music that is being playing by playback device 102c in the Patio zone. In such a case, playback devices 102c and 102n may be playing the hip-hop in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the MPS 100 may be dynamically modified. As such, the MPS 100 may support numerous configurations. For example, if a user physically moves one or more playback devices to or from a zone, the MPS 100 may be reconfigured to accommodate the change(s). For instance, if the user physically moves the playback device 102c from the Patio zone to the Office zone, the Office zone may now include both the playback devices 102c and 102n. In some cases, the user may pair or group the moved playback device 102c with the Office zone and/or rename the players in the Office zone using, for example, one of the controller devices 104 and/or voice input. As another example, if one or more playback devices 102 are moved to a particular space in the home environment that is not already a playback zone, the moved playback device(s) may be renamed or associated with a playback zone for the particular space.

Further, different playback zones of the MPS 100 may be dynamically combined into zone groups or split up into individual playback zones. For example, the Dining Room zone and the Kitchen zone may be combined into a zone group for a dinner party such that playback devices 102i and 102l may render audio content in synchrony. As another example, bonded playback devices in the Den zone may be split into (i) a television zone and (ii) a separate listening zone. The television zone may include the Front playback device 102b. The listening zone may include the Right, Left, and SUB playback devices 102a, 102j, and 102k, which may be grouped, paired, or merged, as described above. Splitting the Den zone in such a manner may allow one user to listen to music in the listening zone in one area of the living room space, and another user to watch the television in another area of the living room space. In a related example, a user may utilize either of the NMD 103a or 103b (FIG. 1B) to control the Den zone before it is separated into the television zone and the listening zone. Once separated, the listening zone may be controlled, for example, by a user in the vicinity of the NMD 103a, and the television zone may be controlled, for example, by a user in the vicinity of the NMD 103b. As described above, however, any of the NMDs 103 may be configured to control the various playback and other devices of the MPS 100.

c. Example Controller Devices

FIG. 4 is a functional block diagram illustrating certain aspects of a selected one of the controller devices 104 of the MPS 100 of FIG. 1A. Such controller devices may also be referred to herein as a "control device" or "controller." The controller device shown in FIG. 4 may include components that are generally similar to certain components of the network devices described above, such as a processor 412, memory 413 storing program software 414, at least one network interface 424, and one or more microphones 422. In one example, a controller device may be a dedicated controller for the MPS 100. In another example, a controller device may be a network device on which media playback system controller application software may be installed, such as for example, an iPhone™, iPad™ or any other smart phone, tablet, or network device (e.g., a networked computer such as a PC or Mac™)

The memory 413 of the controller device 104 may be configured to store controller application software and other data associated with the MPS 100 and/or a user of the system 100. The memory 413 may be loaded with instructions in software 414 that are executable by the processor 412 to achieve certain functions, such as facilitating user access, control, and/or configuration of the MPS 100. The controller device 104 is configured to communicate with other network devices via the network interface 424, which may take the form of a wireless interface, as described above.

In one example, system information (e.g., such as a state variable) may be communicated between the controller device 104 and other devices via the network interface 424. For instance, the controller device 104 may receive playback zone and zone group configurations in the MPS 100 from a playback device, an NMD, or another network device. Likewise, the controller device 104 may transmit such system information to a playback device or another network device via the network interface 424. In some cases, the other network device may be another controller device.

The controller device 104 may also communicate playback device control commands, such as volume control and audio playback control, to a playback device via the network interface 424. As suggested above, changes to configurations of the MPS 100 may also be performed by a user using the controller device 104. The configuration changes may include adding/removing one or more playback devices to/from a zone, adding/removing one or more zones to/from a zone group, forming a bonded or merged player, separating one or more playback devices from a bonded or merged player, among others.

As shown in FIG. 4, the controller device 104 also includes a user interface 440 that is generally configured to facilitate user access and control of the MPS 100. The user interface 440 may include a touch-screen display or other physical interface configured to provide various graphical controller interfaces, such as the controller interfaces 540a and 540b shown in FIGS. 5A and 5B. Referring to FIGS. 5A and 5B together, the controller interfaces 540a and 540b includes a playback control region 542, a playback zone region 543, a playback status region 544, a playback queue region 546, and a sources region 548. The user interface as shown is just one example of an interface that may be provided on a network device, such as the controller device shown in FIG. 4, and accessed by users to control a media playback system, such as the MPS 100. Other user interfaces of varying formats, styles, and interactive sequences may alternatively be implemented on one or more network devices to provide comparable control access to a media playback system.

The playback control region 542 (FIG. 5A) may include selectable icons (e.g., by way of touch or by using a cursor) that, when selected, cause playback devices in a selected playback zone or zone group to play or pause, fast forward, rewind, skip to next, skip to previous, enter/exit shuffle mode, enter/exit repeat mode, enter/exit cross fade mode, etc. The playback control region 542 may also include selectable icons that, when selected, modify equalization settings and/or playback volume, among other possibilities.

The playback zone region 543 (FIG. 5B) may include representations of playback zones within the MPS 100. The playback zones regions 543 may also include a representation of zone groups, such as the Dining Room+Kitchen zone group, as shown.

In some embodiments, the graphical representations of playback zones may be selectable to bring up additional selectable icons to manage or configure the playback zones in the MPS 100, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the MPS 100 to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface are also possible. The representations of playback zones in the playback zone region 543 (FIG. 5B) may be dynamically updated as playback zone or zone group configurations are modified.

The playback status region 544 (FIG. 5A) may include graphical representations of audio content that is presently being played, previously played, or scheduled to play next in the selected playback zone or zone group. The selected playback zone or zone group may be visually distinguished on a controller interface, such as within the playback zone region 543 and/or the playback status region 544. The graphical representations may include track title, artist name, album name, album year, track length, and/or other relevant information that may be useful for the user to know when controlling the MPS 100 via a controller interface.

The playback queue region 546 may include graphical representations of audio content in a playback queue associated with the selected playback zone or zone group. In some embodiments, each playback zone or zone group may be associated with a playback queue comprising information corresponding to zero or more audio items for playback by the playback zone or zone group. For instance, each audio item in the playback queue may comprise a uniform resource identifier (URI), a uniform resource locator (URL), or some other identifier that may be used by a playback device in the playback zone or zone group to find and/or retrieve the audio item from a local audio content source or a networked audio content source, which may then be played back by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streamed audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue or may be associated with a new playback queue that is empty or contains audio items from the playback queue associated with the established zone group before the established zone group was ungrouped. Similarly, the resulting second playback zone may be re-associated with the previous second playback queue or may be associated with a new playback queue that is empty or contains audio items from the playback queue associated with the established zone group before the established zone group was ungrouped. Other examples are also possible.

With reference still to FIGS. 5A and 5B, the graphical representations of audio content in the playback queue region 646 (FIG. 5A) may include track titles, artist names, track lengths, and/or other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The sources region 548 may include graphical representations of selectable audio content sources and/or selectable voice assistants associated with a corresponding VAS. The VASes may be selectively assigned. In some examples, multiple VASes, such as AMAZON's Alexa, MICROSOFT's Cortana, etc., may be invokable by the same NMD. In some embodiments, a user may assign a VAS exclusively to one or more NMDs. For example, a user may assign a first VAS to one or both of the NMDs 102a and 102b in the Living Room shown in FIG. 1A, and a second VAS to the NMD 103f in the Kitchen. Other examples are possible.

d. Example Audio Content Sources

The audio sources in the sources region 548 may be audio content sources from which audio content may be retrieved and played by the selected playback zone or zone group. One or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., via a line-in connection). In another example, audio content may be provided to a playback device over a network via one or more other playback devices or network devices. As described in greater detail below, in some embodiments, audio content may be provided by one or more media content services.

Example audio content sources may include a memory of one or more playback devices in a media playback system such as the MPS 100 of FIG. 1, local music libraries on one or more network devices (e.g., a controller device, a network-enabled personal computer, or a networked-attached storage ("NAS")), streaming audio services providing audio content via the Internet (e.g., cloud-based music services), or audio sources connected to the media playback system via a line-in input connection on a playback device or network device, among other possibilities.

In some embodiments, audio content sources may be added or removed from a media playback system such as the MPS 100 of FIG. 1A. In one example, an indexing of audio items may be performed whenever one or more audio content sources are added, removed, or updated. Indexing of audio items may involve scanning for identifiable audio items in all folders/directories shared over a network accessible by playback devices in the media playback system and generating or updating an audio content database comprising metadata (e.g., title, artist, album, track length, among others) and other associated information, such as a URI or URL for each identifiable audio item found. Other examples for managing and maintaining audio content sources may also be possible.

Figure 6:
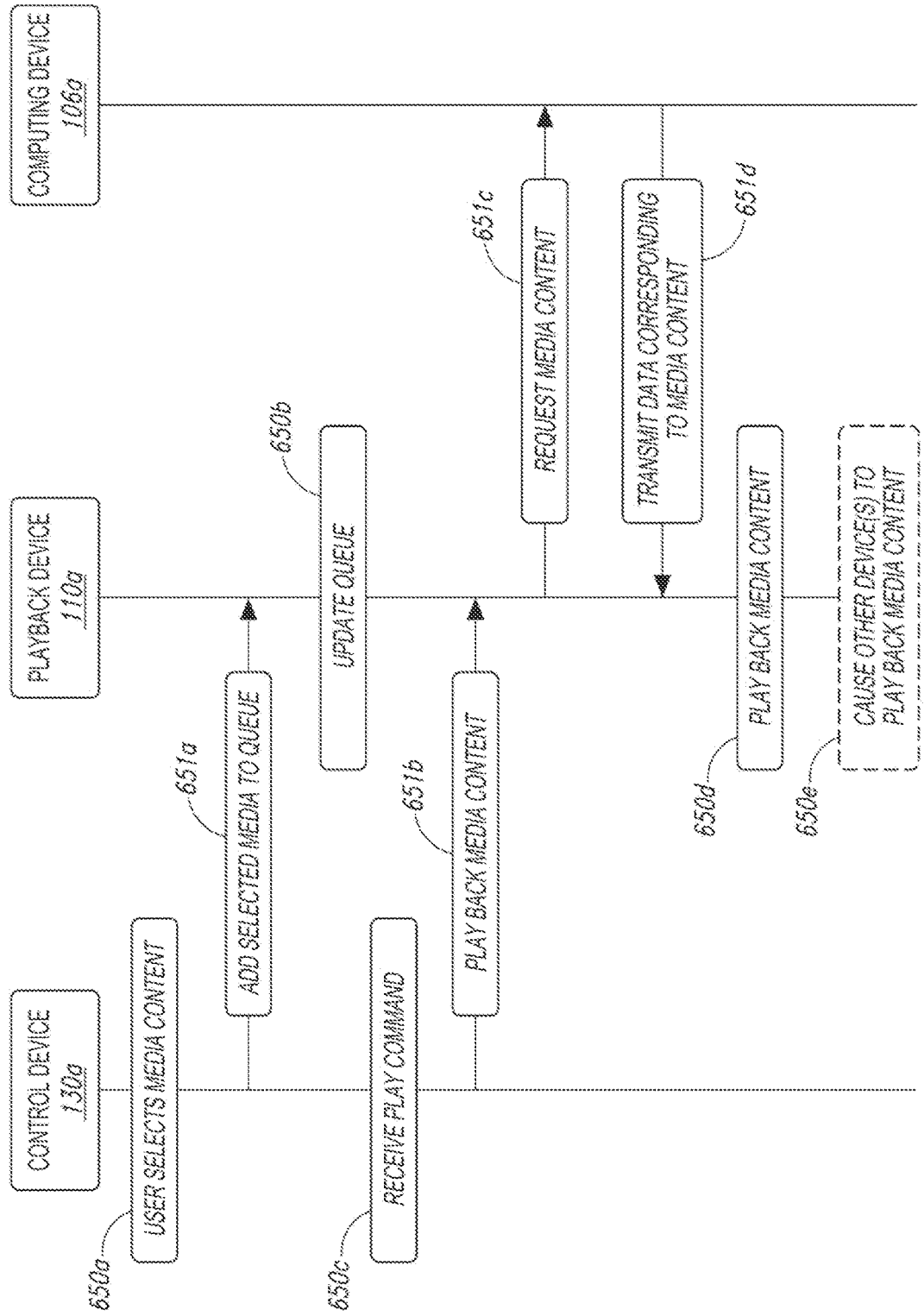
FIG. 6 is a message flow diagram of a media playback system.

FIG. 6 is a message flow diagram illustrating data exchanges between devices of the MPS 100. At step 650a, the MPS 100 receives an indication of selected media content (e.g., one or more songs, albums, playlists, podcasts, videos, stations) via the control device 104. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 104 transmits a message 651a to the playback device 102 (FIGS. 1A-1C) to add the selected media content to a playback queue on the playback device 102.

At step 650b, the playback device 102 receives the message 651a and adds the selected media content to the playback queue for play back.

At step 650c, the control device 104 receives input corresponding to a command to play back the selected media content. In response to receiving the input corresponding to the command to play back the selected media content, the control device 104 transmits a message 651b to the playback device 102 causing the playback device 102 to play back the selected media content. In response to receiving the message 651b, the playback device 102 transmits a message 651c to the computing device 106 requesting the selected media content. The computing device 106, in response to receiving the message 651c, transmits a message 651d comprising data (e.g., audio data, video data, a URL, a URI) corresponding to the requested media content.

At step 650d, the playback device 102 receives the message 651d with the data corresponding to the requested media content and plays back the associated media content.

At step 650e, the playback device 102 optionally causes one or more other devices to play back the selected media content. In one example, the playback device 102 is one of a bonded zone of two or more players (FIG. 1M). The playback device 102 can receive the selected media content and transmit all or a portion of the media content to other devices in the bonded zone. In another example, the playback device 102 is a coordinator of a group and is configured to transmit and receive timing information from one or more other devices in the group. The other one or more devices in the group can receive the selected media content from the computing device 106, and begin playback of the selected media content in response to a message from the playback device 102 such that all of the devices in the group play back the selected media content in synchrony.

III. Example Detection of Environmental Changes

Figure 7:
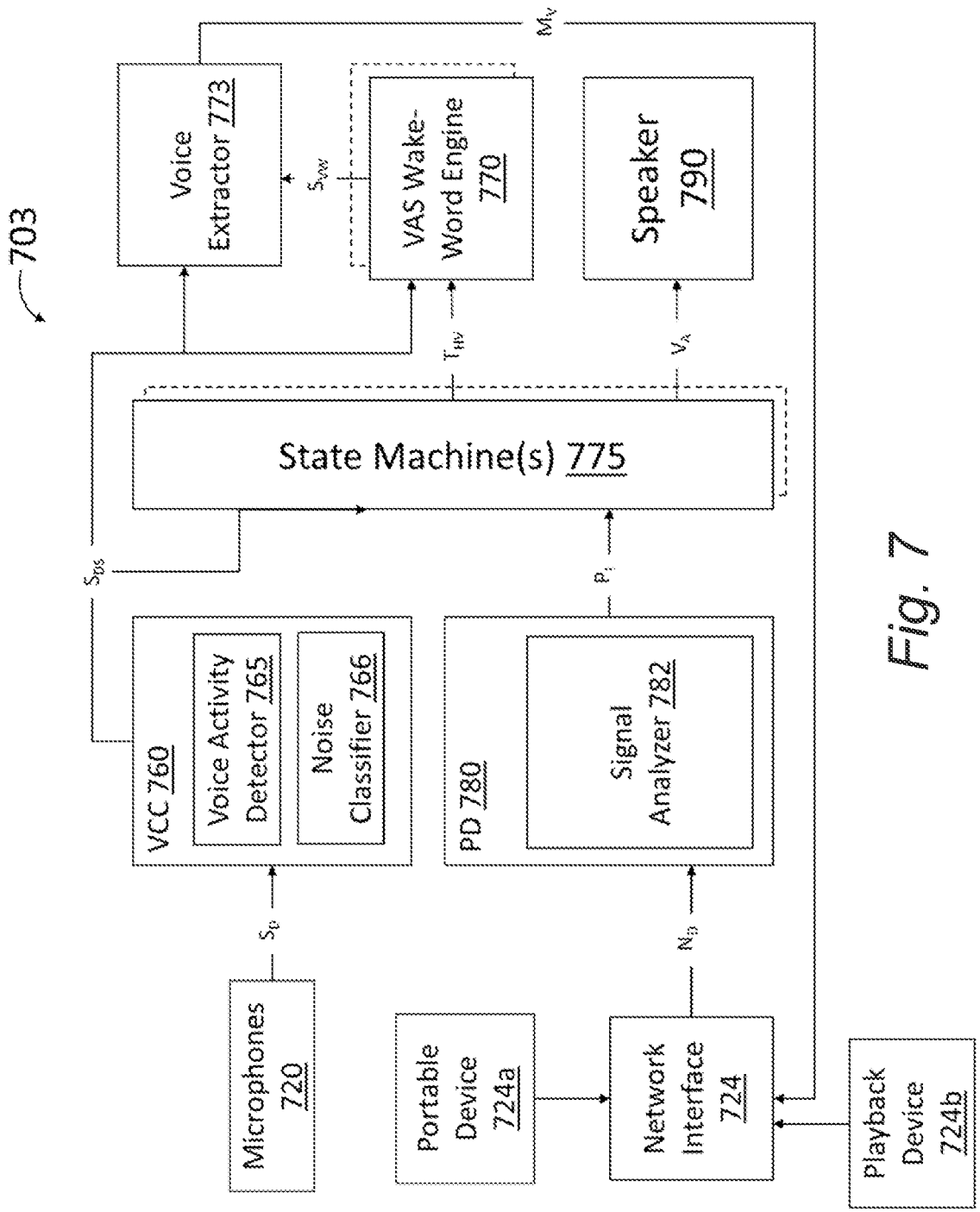
FIG. 7 is a functional block diagram illustrating an example network microphone device in accordance with aspects of the disclosure.

FIG. 7 is a functional block diagrams showing aspects of an NMD 703 configured in accordance with embodiments of the disclosure, although it will be appreciated that playback devices not comprising microphones may be used for detecting environmental changes in certain embodiments. The NMD 703 may be generally similar to the NMD 103 and include similar components. As described in more detail below, the NMD 703 may be configured to handle certain voice inputs locally, without necessarily transmitting data representing the voice input to a voice assistant service. However, the NMD 703 is also configured to process other voice inputs using a voice assistant service. In further examples, the NMD 703 may be configured to process voice inputs using a voice assistant service and may have limited or no local NLU or command keyword detection.

a. Sound Data Stream Analysis

The NMD 703 includes voice capture components ("VCC") 760, a keyword engine 770, and a voice extractor 773. The keyword engine 770 and the voice extractor 773 are operably coupled to the VCC 760. The NMD 703a further a command keyword engine 771a operably coupled to the VCC 760.

The NMD 703 further includes microphones 720 and the at least one network interface 724 as described above and may also include other components, such as audio amplifiers, a user interface, etc., which are not shown in FIG. 7 for purposes of clarity. As mentioned above, some embodiments may not include microphones and as such operate as playback devices, capable of detecting changes in the environment in other ways. The microphones 720 of the NMD 703a are configured to provide detected sound, SD, from the environment of the NMD 703 to the VCC 760. The detected sound SD may take the form of one or more analog or digital signals. In example implementations, the detected sound SD may be composed of a plurality signals associated with respective channels that are fed to the VCC 760. For simplicity, only a single channel is shown in FIG. 7.

Each channel may correspond to a particular microphone 720. For example, an NMD having six microphones may have six corresponding channels. Each channel of the detected sound SD may bear certain similarities to the other channels but may differ in certain regards, which may be due to the position of the given channel's corresponding microphone relative to the microphones of other channels. For example, one or more of the channels of the detected sound SD may have a greater signal to noise ratio ("SNR") of speech to background noise than other channels.

In some examples, the VCC 760 includes an AEC (not shown), a spatial processor (not shown), and one or more buffers (not shown). In operation, the AEC receives the detected sound SD and filters or otherwise processes the sound to suppress echoes and/or to otherwise improve the quality of the detected sound SD. That processed sound may then be passed to the spatial processor.

The spatial processor is typically configured to analyze the detected sound SD and identify certain characteristics, such as a sound's amplitude (e.g., decibel level), frequency spectrum, directionality, etc. In one respect, the spatial processor may help filter or suppress ambient noise in the detected sound SD from potential user speech based on similarities and differences in the constituent channels of the detected sound SD, as discussed above. As one possibility, the spatial processor may monitor metrics that distinguish speech from other sounds. Such metrics can include, for example, energy within the speech band relative to background noise and entropy within the speech band—a measure of spectral structure—which is typically lower in speech than in most common background noise. In some implementations, the spatial processor may be configured to determine a speech presence probability, examples of such functionality are disclosed in U.S. patent application Ser. No. 15/984,073, filed May 18, 2018, titled "Linear Filtering for Noise-Suppressed Speech Detection," which is incorporated herein by reference in its entirety.

In operation, the one or more buffers—one or more of which may be part of or separate from the memory 213 (FIG. 2A)—capture data corresponding to the detected sound SD. More specifically, the one or more buffers capture detected-sound data that was processed by the upstream AEC and spatial processor.

The network interface 724 may then provide this information to a remote server that may be associated with the MPS 100. In one aspect, the information stored in the additional buffer does not reveal the content of any speech but instead is indicative of certain unique features of the detected sound itself. In a related aspect, the information may be communicated between computing devices, such as the various computing devices of the MPS 100, without necessarily implicating privacy concerns. In practice, the MPS 100 can use this information to adapt and fine-tune voice processing algorithms, including sensitivity tuning as discussed below. In some implementations the additional buffer may comprise or include functionality similar to lookback buffers disclosed, for example, in U.S. patent application Ser. No. 15/989,715, filed May 25, 2018, titled "Determining and Adapting to Changes in Microphone Performance of Playback Devices"; U.S. patent application Ser. No. 16/141,875, filed Sep. 25, 2018, titled "Voice Detection Optimization Based on Selected Voice Assistant Service"; and U.S. patent application Ser. No. 16/138,111, filed Sep. 21, 2018, titled "Voice Detection Optimization Using Sound Metadata," which are incorporated herein by reference in their entireties.

In any event, the detected-sound data forms a digital representation (i.e., sound-data stream), $S_{DS}$, of the sound detected by the microphones 720. In practice, the sound-data stream $S_{DS}$ may take a variety of forms. As one possibility, the sound-data stream $S_{DS}$ may be composed of frames, each of which may include one or more sound samples. The frames may be streamed (i.e., read out) from the one or more buffers for further processing by downstream components, such as the keyword engines 770 and the voice extractor 773 of the NMD 703.

In some implementations, at least one buffer captures detected-sound data utilizing a sliding window approach in which a given amount (i.e., a given window) of the most recently captured detected-sound data is retained in the at least one buffer while older detected-sound data is overwritten when it falls outside of the window. For example, at least one buffer may temporarily retain 20 frames of a sound specimen at given time, discard the oldest frame after an expiration time, and then capture a new frame, which is added to the 19 prior frames of the sound specimen.

In practice, when the sound-data stream $S_{DS}$ is composed of frames, the frames may take a variety of forms having a variety of characteristics. As one possibility, the frames may take the form of audio frames that have a certain resolution (e.g., 16 bits of resolution), which may be based on a sampling rate (e.g., 44,100 Hz). Additionally, or alternatively, the frames may include information corresponding to a given sound specimen that the frames define, such as metadata that indicates frequency response, power input level, SNR, microphone channel identification, and/or other information of the given sound specimen, among other examples. Thus, in some embodiments, a frame may include a portion of sound (e.g., one or more samples of a given sound specimen) and metadata regarding the portion of sound. In other embodiments, a frame may only include a portion of sound (e.g., one or more samples of a given sound specimen) or metadata regarding a portion of sound.

In any case, downstream components of the NMD 703 may process the sound-data stream $S_{DS}$. For instance, the keyword engines 770 are configured to apply one or more identification algorithms to the sound-data stream $S_{DS}$ (e.g., streamed sound frames) to spot potential wake words in the detected-sound SD. This process may be referred to as automatic speech recognition. The NMD 703 may also include a command keyword engine (not shown), 770 which may apply different identification algorithms corresponding to their respective wake words, and further generate different events based on detecting a wake word in the detected-sound SD.

Example wake word detection algorithms accept audio as input and provide an indication of whether a wake word is present in the audio. Many first- and third-party wake word detection algorithms are known and commercially available. For instance, operators of a voice service may make their algorithm available for use in third-party devices. Alternatively, an algorithm may be trained to detect certain wake-words.

For instance, when the keyword engine 770 detects a potential VAS wake word, the VAS work-word engine 770 provides an indication of a "keyword event" (also referred to as a "keyword trigger"). In the illustrated example of FIG. 7, the keyword engine 770 outputs a signal, $S_{VW}$, that indicates the occurrence of a keyword event to the voice extractor 773. Generating a wake-word trigger is based on the confidence score for the given wake-word. For instance, the keyword engine 770 may generate a wake-word trigger when the confidence score for a given input sound exceeds a given threshold value (e.g., 0.5 on a scale of 0-1, indicating that the given input sound is more likely than not the wake-word keyword). Conversely, when the confidence score for a given sound is at or below the given threshold value, the keyword engine 770 does not generate the wake-word trigger. The threshold value may be variable as will be described in further detail below.

In multi-VAS implementations, the NMD 703 may include a VAS selector (not shown) that is generally configured to direct extraction by the voice extractor 773 and transmission of the sound-data stream $S_{DS}$ to the appropriate VAS when a given wake-word is identified by a particular wake-word engine (and a corresponding wake-word trigger), such as the keyword engine 770 and at least one additional keyword engine (shown in dashed lines). In such implementations, the NMD 703 may include multiple, different keyword engines and/or voice extractors, each supported by a respective VAS.

Similar to the discussion above, each keyword engine 770 may be configured to receive as input the sound-data stream $S_{DS}$ from the one or more buffers and apply identification algorithms to cause a wake-word trigger for the appropriate VAS. Thus, as one example, the keyword engine 770 may be configured to identify the wake word "Alexa" and cause the NMD 703 to invoke the AMAZON VAS when "Alexa" is spotted. As another example, a further wake-word engine 770 (shown in dashed lines) may be configured to identify the wake word "Ok, Google" and cause the NMD 703 to invoke the GOOGLE VAS when "Ok, Google" is spotted. In single-VAS implementations, the VAS selector (not shown) may be omitted.

In response to the keyword event (e.g., in response to the signal $S_{VW}$ indicating the wake-word event), the voice extractor 773 is configured to receive and format (e.g., packetize) the sound-data stream $S_{DS}$. For instance, the voice extractor 773 packetizes the frames of the sound-data stream $S_{DS}$ into messages. The voice extractor 773 transmits or streams these messages, $M_V$, that may contain voice input in real time or near real time to a remote VAS via the network interface 724.

The VAS is configured to process the sound-data stream $S_{DS}$ contained in the messages $M_V$ sent from the NMD 703. More specifically, the NMD 703 is configured to identify a voice input based on the sound-data stream $S_{DS}$. As described in connection with FIG. 2C, the voice input may include a keyword portion and an utterance portion. The keyword portion corresponds to detected sound that caused a wake-word event or leads to a command-keyword event when one or more certain conditions, such as certain playback conditions, are met. For instance, when the voice input includes a VAS wake word, the keyword portion corresponds to detected sound that caused the wake-word engine 770 to output the wake-word event signal $S_{VW}$ to the voice extractor 773. The utterance portion in this case corresponds to detected sound that potentially comprises a user request following the keyword portion.

When a keyword event occurs, the VAS may first process the keyword portion within the sound-data stream $S_{DS}$ to verify the presence of a VAS wake word. In some instances, the VAS may determine that the keyword portion comprises a false wake word (e.g., the word "Election" when the word "Alexa" is the target VAS wake word). In such an occurrence, the VAS may send a response to the NMD 703 with an instruction for the NMD 703 to cease extraction of sound data, which causes the voice extractor 773 to cease further streaming of the detected-sound data to the VAS. The keyword engine 770 may resume or continue monitoring sound specimens until it spots another potential VAS wake word, leading to another keyword event. In some implementations, the VAS does not process or receive the keyword portion but instead processes only the utterance portion.

In any case, the VAS processes the utterance portion to identify the presence of any words in the detected-sound data and to determine an underlying intent from these words. The words may correspond to one or more commands, as well as certain keywords. The keyword may be, for example, a word in the voice input identifying a particular device or group in the MPS 100. For instance, in the illustrated example, the keyword may be one or more words identifying one or more zones in which the music is to be played, such as the Living Room and the Dining Room (FIG. 1A).

To determine the intent of the words, the VAS is typically in communication with one or more databases associated with the VAS (not shown) and/or one or more databases (not shown) of the MPS 100. Such databases may store various user data, analytics, catalogs, and other information for natural language processing and/or other processing. In some implementations, such databases may be updated for adaptive learning and feedback for a neural network based on voice-input processing. In some cases, the utterance portion may include additional information, such as detected pauses (e.g., periods of non-speech) between words spoken by a user, as shown in FIG. 2C. The pauses may demarcate the locations of separate commands, keywords, or other information spoke by the user within the utterance portion.

After processing the voice input, the VAS may send a response to the MPS 100 with an instruction to perform one or more actions based on an intent it determined from the voice input. For example, based on the voice input, the VAS may direct the MPS 100 to initiate playback on one or more of the playback devices 102, control one or more of these playback devices 102 (e.g., raise/lower volume, group/ungroup devices, etc.), or turn on/off certain smart devices, among other actions. After receiving the response from the VAS, the wake-word engine 770 of the NMD 703 may resume or continue to monitor the sound-data stream $S_{DS1}$ until it spots another potential wake-word, as discussed above.

In general, the one or more identification algorithms that a particular keyword engine, such as the keyword engine 770, applies are configured to analyze certain characteristics of the detected sound stream $S_{DS}$ and compare those characteristics to corresponding characteristics of the particular keyword engine's one or more particular VAS wake words. For example, the wake-word engine 770 may apply one or more identification algorithms to spot spectral characteristics in the detected sound stream $S_{DS}$ that match the spectral characteristics of the engine's one or more wake words, and thereby determine that the detected sound SD comprises a voice input including a particular VAS wake word.

In some implementations, the one or more identification algorithms may be third-party identification algorithms (i.e., developed by a company other than the company that provides the NMD 703a). For instance, operators of a voice service (e.g., AMAZON) may make their respective algorithms (e.g., identification algorithms corresponding to AMAZON's ALEXA) available for use in third-party devices (e.g., the NMDs 103), which are then trained to identify one or more wake words for the particular voice assistant service. Additionally, or alternatively, the one or more identification algorithms may be first-party identification algorithms that are developed and trained to identify certain wake words that are not necessarily particular to a given voice service. Other possibilities also exist.

As noted above, the NMD 703 may also include a command keyword engine (not shown) in parallel with the keyword engine 770. Like the keyword engine 770, the command keyword engine may apply one or more identification algorithms corresponding to one or more wake words. A "command keyword event" is generated when a particular command keyword is identified in the detected-sound SD. In contrast to the nonce words typically as utilized as VAS wake words, command keywords function as both the activation word and the command itself. For instance, example command keywords may correspond to playback commands (e.g., "play," "pause," "skip," etc.) as well as control commands ("turn on"), among other examples. Under appropriate conditions, based on detecting one of these command keywords, the NMD 703a performs the corresponding command.

The command keyword engine 771 can employ an automatic speech recognizer (ASR). The ASR is configured to output phonetic or phonemic representations, such as text corresponding to words, based on sound in the sound-data stream $S_{DS}$ to text. For instance, the ASR may transcribe spoken words represented in the sound-data stream $S_{DS}$ to one or more strings representing the voice input as text. The command keyword engine can feed ASR output to a local natural language unit (NLU) (not shown) that identifies particular keywords as being command keywords for invoking command-keyword events, as described below.

As noted above, in some example implementations, the NMD 703 is configured to perform natural language processing, which may be carried out using an onboard natural language processor, referred to herein as an NLU. The local NLU is configured to analyze text output of the ASR of the command keyword engine to spot (i.e., detect or identify) keywords in the voice input. The local NLU includes a library of keywords (i.e., words and phrases) corresponding to respective commands and/or parameters.

In one aspect, the library of the local NLU includes command keywords. When the local NLU 779 identifies a command keyword, the command keyword engine generates a command keyword event and performs a command corresponding to the command keyword in the signal, assuming that one or more conditions corresponding to that command keyword are satisfied.

Further, the library of the local NLU may also include keywords corresponding to parameters. The local NLU may then determine an underlying intent from the matched keywords in the voice input. For instance, if the local NLU matches the keywords "David Bowie" and "kitchen" in combination with a play command, the local NLU may determine an intent of playing David Bowie in the Kitchen 101h on the playback device 102i. In contrast to a processing of the voice input by a cloud-based VAS, local processing of the voice input by the local NLU may be relatively less sophisticated, as the NLU does not have access to the relatively greater processing capabilities and larger voice databases that a VAS generally has access to.

In some examples, the local NLU may determine an intent with one or more slots, which correspond to respective keywords. For instance, referring back to the play David Bowie in the Kitchen example, when processing the voice input, the local NLU may determine that an intent is to play music (e.g., intent=playMusic), while a first slot includes David Bowie as target content (e.g., slot1=DavidBowie) and a second slot includes the Kitchen 101h as the target playback device (e.g., slot2=kitchen). Here, the intent (to "playMusic") is based on the command keyword and the slots are parameters modifying the intent to a particular target content and playback device.

Within examples, the command keyword engine outputs a signal that indicates the occurrence of a command keyword event to the local NLU. In response to the command keyword event (e.g., in response to the signal $S_{CW}$ indicating the command keyword event), the local NLU is configured to receive and process the signal. In particular, the local NLU looks at the words within the signal to find keywords that match keywords in the library of the local NLU.

Some error in performing local automatic speech recognition is expected. Within examples, the ASR may generate a confidence score when transcribing spoken words to text, which indicates how closely the spoken words in the voice input matches the sound patterns for that word. In some implementations, generating a command keyword event is based on the confidence score for a given command keyword. For instance, the command keyword engine may generate a command keyword event when the confidence score for a given sound exceeds a given threshold value (e.g., 0.5 on a scale of 0-1, indicating that the given sound is more likely than not the command keyword). Conversely, when the confidence score for a given sound is at or below the given threshold value, the command keyword engine does not generate the command keyword event. As with the wake-word trigger, the threshold value may be variable as will be described in further detail below.

Similarly, some error in performing keyword matching is expected. Within examples, the local NLU may generate a confidence score when determining an intent, which indicates how closely the transcribed words in the signal $S_{ASR}$ match the corresponding keywords in the library of the local NLU. In some implementations, performing an operation according to a determined intent is based on the confidence score for keywords matched in the signal. For instance, the NMD 703 may perform an operation according to a determined intent when the confidence score for a given sound exceeds a given threshold value (e.g., 0.5 on a scale of 0-1, indicating that the given sound is more likely than not the command keyword). Conversely, when the confidence score for a given intent is at or below the given threshold value, the NMD 703 does not perform the operation according to the determined intent.

As noted above, in some implementations, a phrase may be used a command keyword, which provides additional syllables to match (or not match). For instance, the phrase "play me some music" has more syllables than "play," which provides additional sound patterns to match to words. Accordingly, command keywords that are phrases may generally be less prone to false wake words.

As indicated above, the NMD 703 may generate a command keyword event (and performs a command corresponding to the detected command keyword) only when certain conditions corresponding to a detected command keyword are met. These conditions are intended to lower the prevalence of false positive command keyword events. For instance, after detecting the command keyword "skip," the NMD 703 generates a command keyword event (and skips to the next track) only when certain playback conditions indicating that a skip should be performed are met. These playback conditions may include, for example, (i) a first condition that a media item is being played back, (ii) a second condition that a queue is active, and (iii) a third condition that the queue includes a media item subsequent to the media item being played back. If any of these conditions are not satisfied, the command keyword event is not generated (and no skip is performed).

The VCC 760 may also comprise a voice activity detector ("VAD") 765. The VAD 765 is configured to detect the presence (or lack thereof) of voice activity in the sound-data stream $S_{DS}$. In particular, the VAD 765 may analyze frames corresponding to the pre-roll portion of the voice input (FIG. 2D) with one or more voice detection algorithms to determine whether voice activity was present in the environment in certain time windows prior to a keyword portion of the voice input.

The VAD 765 may utilize any suitable voice activity detection algorithms. Example voice detection algorithms involve determining whether a given frame includes one or more features or qualities that correspond to voice activity, and further determining whether those features or qualities diverge from noise to a given extent (e.g., if a value exceeds a threshold value $T_{HV}$ for a given frame). Some example voice detection algorithms involve filtering or otherwise reducing noise in the frames prior to identifying the features or qualities.

In some examples, the VAD 765 may determine whether voice activity is present in the environment based on one or more metrics. For example, the VAD 765 can be configured distinguish between frames that include voice activity and frames that do not include voice activity. The frames that the VAD determines have voice activity may be caused by speech regardless of whether it near- or far-field. In this example and others, the VAD 765 may determine a count of frames in the pre-roll portion of the voice input that indicate voice activity. If this count exceeds a threshold percentage or number of frames, the VAD 765 may be configured to output a signal, set a state variable, or perform an action indicating that voice activity is present in the environment. Other metrics may be used as well in addition to, or as an alternative to, such a count.

The presence of voice activity in an environment may indicate that a voice input is being directed to the NMD 703. Accordingly, when the VAD 765 indicates that voice activity is not present in the environment (perhaps as indicated by a state variable set by the VAD 765) this may be configured as one of the command conditions for the command keywords. When this condition is met (i.e., the VAD 765 indicates that voice activity is present in the environment), the state machine 775a will transition to the first state to enable performing commands based on command keywords, so long as any other conditions for a particular command keyword are satisfied.

Further, in some implementations, the NMD 703 may include a noise classifier 766. The noise classifier 766 is configured to determine sound metadata (frequency response, signal levels, etc.) and identify signatures in the sound metadata corresponding to various noise sources. The noise classifier 766 may include a neural network or other mathematical model configured to identify different types of noise in detected sound data or metadata. One classification of noise may be speech (e.g., far-field speech). Another classification may be a specific type of speech, such as background speech, and example of which is described in greater detail with reference to FIG. 8. Background speech may be differentiated from other types of voice-like activity, such as more general voice activity (e.g., cadence, pauses, or other characteristics) of voice-like activity detected by the VAD 765.

For example, analyzing the sound metadata can include comparing one or more features of the sound metadata with known noise reference values or a sample population data with known noise. For example, any features of the sound metadata such as signal levels, frequency response spectra, etc. can be compared with noise reference values or values collected and averaged over a sample population. In some examples, analyzing the sound metadata includes projecting the frequency response spectrum onto an eigenspace corresponding to aggregated frequency response spectra from a population of NMDs. Further, projecting the frequency response spectrum onto an eigenspace can be performed as a pre-processing step to facilitate downstream classification.

In various embodiments, any number of different techniques for classification of noise using the sound metadata can be used, for example machine learning using decision trees, or Bayesian classifiers, neural networks, or any other classification techniques. Alternatively or additionally, various clustering techniques may be used, for example K-Means clustering, mean-shift clustering, expectation-maximization clustering, or any other suitable clustering technique. Techniques to classify noise may include one or more techniques disclosed in U.S. application Ser. No. 16/227,308 filed Dec. 20, 2018, and titled "Optimization of Network Microphone Devices Using Noise Classification," which is herein incorporated by reference in its entirety.

b. Proximity Detection

The NMD 703 also comprises a proximity detector engine (PD) 780. The PD 780 is configured to determine the proximity of one or more users to the NMD 703. The proximity of one or more users may be determined using a number of different methods, such as via a passive infrared sensor (PIR) or other sensor, interactions with the wireless signals received by the NMD 703 from other NMDs (not shown) of the playback system, and interactions with the wireless signals received from portable devices, such as the controller device of FIG. 4, which form part of the playback system. The PD 780 comprises at least signal property analyzer 782 which is arranged to analyze signal data ND received at the PD 780 over the network interface 724. The PD 780 may comprise other modules for analyzing and/or determining the proximity of a user to the NMD 703. The PD 780 may include one or more sensors (not shown) that output a signal indicating whether one or more users are in proximity to the NMD 703. Example sensors include a temperature sensor, an infrared sensor, an imaging sensor, and a capacitive sensor.

The signal analyzer 784 may be used to determine the location of a portable device, such the controller described above in relation to FIG. 4. The localization of the portable device 724a may be undertaken by the NMD 703 alone or in combination with similar localization capabilities of other NMDs in the playback system. In several embodiments, a coordinator device is designated to collect and store signal information from reference devices and/or from the portable device. Coordinator devices in accordance with numerous embodiments can be selected from the available devices of a playback system based on one or more of several factors, including (but not limited to) Received Signal Strength Indicator (RSSI) and/or channel state information (CSI) of signals received from the portable device at the reference devices, frequency of use, device specifications (e.g., number of processor cores, processor clock speed, processor cache size, non-volatile memory size, volatile memory size, etc.). For example, a particular NMD may be selected as a coordinator device based on how long the processor has been idle, so as to not interfere with the operation of any other devices during playback (e.g. selecting a speaker sitting in a guest bedroom which is used infrequently).

In a number of embodiments, localizing a portable device 724a (e.g., a portable playback device, a smartphone, a tablet, etc.) can be used to identify a relative location for the portable device 724a based on a number of reference devices in a playback system. Furthermore, this can provide an indication as to the location of one or more users relative to the playback devices, such as NMD 703, in the playback system. Reference devices in accordance with a number of embodiments can include stationary devices and/or portable devices. As the localizing of a portable device is not an absolute location, but rather a location relative to the locations of other reference devices, processes in accordance with many embodiments can be used to determine the nearest device, even when one or more of the reference devices is also portable.

In certain embodiments, signals are transmitted when each reference device (e.g., network players, NMDs, etc.) and/or portable device performs a wireless (e.g., WI-FI) scan. Wireless scans in accordance with numerous embodiments can include broadcasting a first wireless signal that causes other wireless devices to respond with a second signal. In a number of embodiments, wireless radios in each device can provide, as a result of a wireless scan, signal information, which can include (but is not limited to) an indication of which devices responded, an indication of how long ago the scan was performed/how long ago a device responded, RSSI values associated with the response from a particular device, and/or CSI values associated with the response from a particular device. Signal information in accordance with certain embodiments is gathered in pairs between all of the devices.

Processes in accordance with certain embodiments can scan periodically, allowing the devices to maintain a history of signals received from the other devices. Reference and/or portable devices in accordance with several embodiments can scan for known devices and collect characteristics (e.g., RSSI/CSI) in a buffer (e.g., a ring buffer) and calculate statistics (e.g., weighted averages, variances, etc.) based on a history of collected signal characteristics. In some embodiments, signal characteristics and/or calculated statistics can be identified by each of the devices, pre-processed, and transmitted to a coordinator device. Coordinator devices in accordance with various embodiments can collect and store signal information from reference devices and/or the portable device. In many embodiments, identified signal characteristics and/or calculated statistics of the signals can be stored in a matrix, that stores values for a given characteristic (e.g., RSSI/CSI).

In numerous embodiments, the captured signal information is noisy data (e.g., raw RSSI values) that may need to be cleaned. Cleaning noisy data in accordance with various embodiments can include computing a weighted average of historic RSSI/CSI values for each signal path to reduce some of the high-frequency noise common in RSSI/CSI values. In a number of embodiments, the weighting factor can be based on timestamps of each RSSI/CSI value (e.g., weighting weight recent RSSI/CSI values more heavily and reducing the weight of older RSSI/CSI values).

From an intuitive standpoint, the stronger the RSSI values associated with a given signal path, the shorter the length of the signal path. For example, if the RSSI values associated with the signal path from a roaming device to a player P1 are high, the roaming device is likely near player P1.

Because RSSI values can be obtained for a large number of signal paths, processes in accordance with a variety of embodiments can layer on additional logic to confirm that the roaming device is actually near a given device. In this example, if the roaming device is actually quite close to P1, the RSSI values associated with the signal path from the roaming device to a second player P2 should be substantially similar to the values associated with the signal path from the first player P1 to P2. Similarly, if the roaming device is actually quite close to P1, the RSSI values for the path from the remote device to a third device P3 should be substantially similar to the RSSI values for the path from P1 to P3. Accordingly, processes in accordance with numerous embodiments can analyze RSSI values associated with multiple different signal paths in a playback system to come up with a probability that a roaming device is near a given stationary device.

Alternatively, or in addition to determining the location of a portable device 724a, the signal analyzer 782 may be configured to determine the relative locations of other devices in the playback system. As mentioned above, these other playback devices need not be NMDs but instead, devices only configured to output audio, furthermore, the other device may be Internet of Things (IoT) devices, servers, and or personal computers.

To determine the relative locations of other devices, the signal analyzer 782 collects signal data ND from a plurality of devices making up the playback system. This signal data may include information such as RSSI and/or CSI values. In many embodiments, the signal analyzer 782 will perform some pre-processing and/or cleaning as described above. Similarly, the pre-processing may occur on a coordinator device.

Once the signals have been collected, they may be normalized and, in some embodiments, may include calculating an average of the signal sent between two devices. The signal analyzer 782 will then determine a model of the environment, based on the strengths of the signals received from the other devices. For example, the model may determine that a first device is closer to a second device based on a ratio between the signals received from each device.

An original layout of the devices may be calculated based on a calibration of the system, then at a subsequent time, a current layout may be determined and differences between the original and current layouts may be determined. In further examples, the location of individual devices may not change, but rather the state of the space between device changes. For example, users may enter the space and move between different positions, rearrange the furniture in the space, etc. Changes in this space state can be determined based on signal patterns measured between devices of the space, and detected changes can be used to modify one or more state variables of at least one playback device of the media playback system, or perform a given action, as will be described in further detail below.

Over time, the information gathered, and the outputs determined by the PD 780 may be used to train a machine learning model that can receive signal characteristics (e.g. raw or pre-processed RSSI/CSI values) as input and generate, based on those signal characteristics an indication of the reference device that a person is standing near. This machine learning model may be refined over time as the users interact with the playback system to identify locations more accurately, and/or determine which actions to undertake. Furthermore, the machine learning model may leverage user interaction information to identify particular user behaviors specific to a given user and construct new training data for those user behaviors.

The proximity information $P_I$ output by the PD 780, which includes for example estimated locations of portable devices can be used in a variety of applications, as will be described in further detail below. The proximity information $P_I$ is passed to the state machines which produce one or more actions as will be described below.

c. State Machine(s)

The NMD 703 includes one or more state machine(s) 775 to facilitate determining whether the appropriate conditions are met. The state machine 775 transitions between a first state and a second state based on whether one or more conditions corresponding to the detected inputs are met, these inputs include the output $P_I$ from the proximity detector 780 and the output $S_{DS}$ from the VCC 760. In particular, for a given input corresponding to a particular command requiring one or more particular conditions, the state machine 775 transitions into a first state when one or more particular conditions are satisfied and transitions into a second state when at least one condition of the one or more particular conditions is not satisfied.

Within example implementations, the input received from the VCC 760 may be forwarded to a first state machine 775 and the input received from the proximity detector $P_I$ may be forwarded to a second state machine 775. In other example implementations, the inputs may be forwarded to a state machine based on one or more user preferences, determined based on the action to undertake when a given environmental change is detected. For example, the presence of multiple people in a given space may be used to indicate that the volume should be increased so as to overcome possible additional background noise, or alternatively, it may be used to indicate that the volume is decreased to more easily facilitate conversations between the people. A choice between these options may be assigned by default, such as by a device manufacturer, or may be specified by a user via a settings panel in a user interface of a controller for the NMD, or another method for setting user preferences.

The NMD 703 may maintain these state variables (either by virtue of being implemented in a playback device or as a stand-alone NMD). The state machine 775 monitors the states indicated in these state variables, and determines whether the states indicated in the appropriate state variables indicate that the command condition(s) are satisfied. Based on these determinations, the state machine 775 transitions between the first state and the second state, as described above.

In some implementations, the keyword engine 770 or command keyword engine (not shown) may be disabled unless certain conditions have been met via the state machines. For example, the first state and the second state of the state machine 775 may operate as enable/disable toggles to the command keyword engine and/or keyword engine 770. In particular, while a state machine 775 corresponding to a particular command keyword is in the first state, the state machine 775 enables the command keyword engine of the particular command keyword. Conversely, while the state machine 775 corresponding to the particular command keyword is in the second state, the state machine 775 disables the command keyword engine of the particular command keyword. Accordingly, the disabled command keyword engine ceases analyzing the sound-data stream $S_{DS}$. In such cases when at least one command condition is not satisfied, the NMD 703 may suppress generation of command keyword event when the command keyword engine detects a command keyword. Suppressing generation may involve gating, blocking or otherwise preventing output from the command keyword engine from generating the command keyword event. Such suppression prevents a command corresponding to the detected command keyword from being performed when at least one command condition is not satisfied. In such embodiments, the command keyword engine may continue analyzing the sound-data stream $S_{DS}$ while the state machine 775 is in the first state, but command keyword events are disabled.

Figure 8:
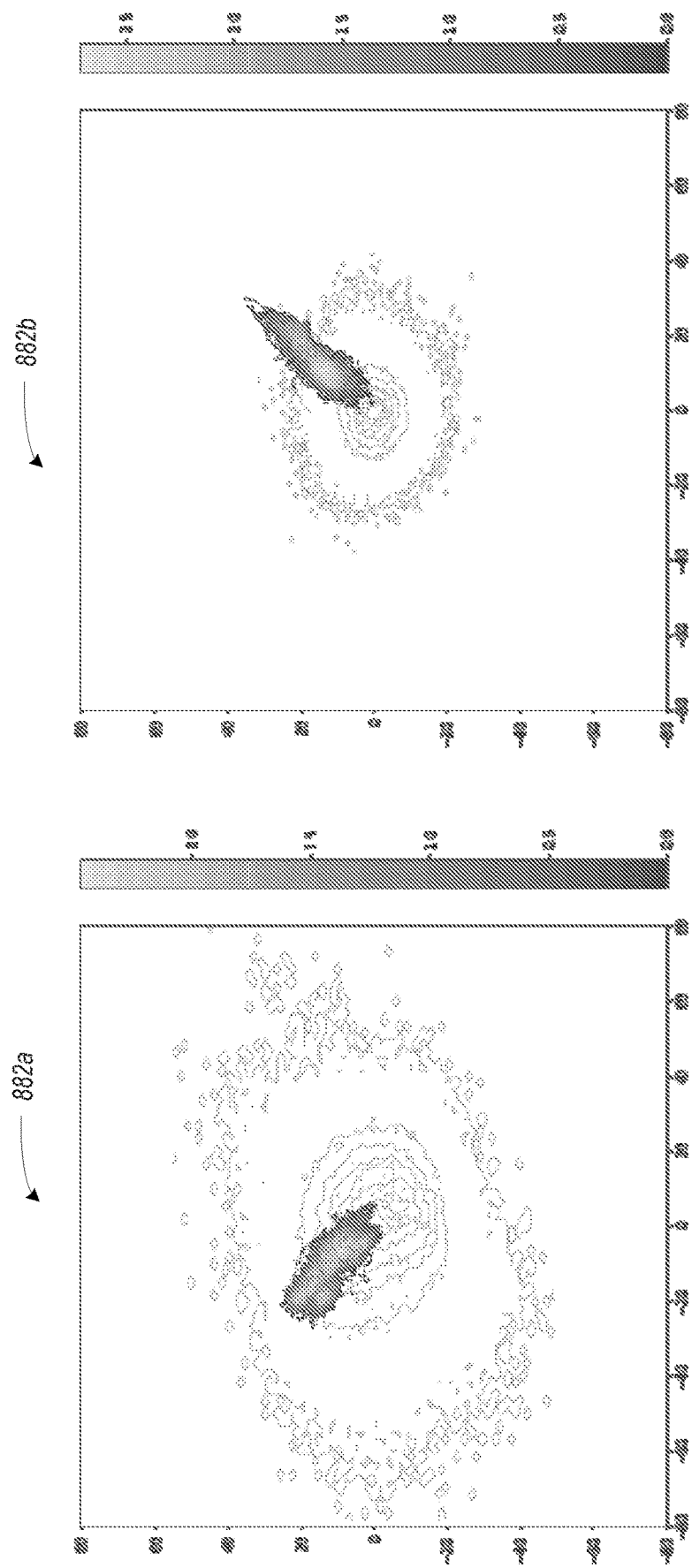
FIG. 8 shows example noise graphs illustrating analyzed sound metadata associated with background speech.

To illustrate, one state machine may be configured to perform an action on the detection of background noise by the noise classifier 766 of the VCC 760. FIG. 8 shows a first plot 882*a* and a second plot 882*b*. The first plot 882*a* and the second plot 882*b* show analyzed sound metadata associated with background speech. These signatures shown in the plots are generated using principal component analysis (PCA). Collected data from a variety of NMDs provides an overall distribution of possible frequency response spectra. In general, principal component analysis can be used to find the orthogonal basis that describes the variance in all the field data. This eigenspace is reflected in the contours shown in the plots of FIG. 8. Each dot in the plot represents a known noise value (e.g., a single frequency response spectrum from an NMD exposed to the noted noise source) that is projected onto the eigenspace. As seen in FIG. 8, these known noise values cluster together when projected onto the eigenspace. In this example, FIG. 8 plots are representative of a four vector analysis, where each vector corresponds to a respective feature. The features collectively are a signature for background speech.

Referring back to FIG. 7, in some implementations, an additional buffer (not shown) may store information (e.g., metadata or the like) regarding the detected sound SD. This additional buffer may be referred to as a "sound metadata buffer." Examples of such sound metadata include: (1) frequency response data, (2) echo return loss enhancement measures, (3) voice direction measures; (4) arbitration statistics; and/or (5) speech spectral data. In example implementations, the noise classifier 766 may analyze the sound metadata in the buffer 769 to classify noise in the detected sound SD.

d. Keyword Threshold Values

As noted above, one classification of sound may be background speech, such as speech indicative of far-field speech and/or speech indicative of a conversation not involving the NMD 703. The noise classifier 766 may output a signal, set a state variable, and/or perform a given action indicating that background speech is present in the environment. The presence of voice activity (i.e., speech) in the pre-roll portion of the voice input indicates that the voice input might not be directed to the NMD 703, but instead be conversational speech within the environment. For instance, a household member might speak something like "our kids should have a play date soon" without intending to direct the command keyword "play" to the NMD 703. As such, the state machine 775 acts as a gatekeeper for enabling the command keyword engine and/or keyword engine 770. In such an example, the threshold value My for either engine may be increased such that any confidence level generated by the keyword engine 770 and command keyword engine needs to be sufficiently high so as to enable the action.

For example, when the noise classifier indicates that background speech is present in the environment, this condition may increase the threshold value My for detecting command keywords. Similarly, the background speech being absent in the environment (perhaps as indicated by a state variable set by the noise classifier 766) decreases the threshold value My for detecting command keywords. Accordingly, the confidence required for the state machine 775 to transition to the first state when the noise classifier 766 indicates that background speech is present in the environment is higher than if background noise is not present.

Similarly, keyword engine 770 generates a VAS wake-word event when certain conditions are met. The NMD 703 includes a state machine 775, which is similar to the state machine 775. The state machine 775 transitions between a first state and a second state based on whether one or more conditions corresponding to the VAS wake word are met.

For instance, in some examples, the keyword engine 770 may generate a VAS wake word event only when background speech is not present in the environment before a VAS wake-word event was detected, or when the threshold value $T_{HV}$ provided by the state machine is below a given value. An indication of whether voice activity is present in the environment may come from the noise classifier 766. As noted above, the noise classifier 766 may be configured to output a signal, set a state variable, and/or perform an action indicating that far-field speech is present in the environment. Yet further, the keyword engine 770 may generate a keyword event only when voice activity is present in the environment. As indicated above, the VAD 765 may be configured to output a signal or set a state variable indicating that voice activity is present in the environment. Again, the threshold value $T_{HV}$ for indicating the presence of voice activity and/or speech may be set based on the output of the VCC 760, and in some embodiments, the level of the threshold value My and/or actions to take may be defined by a user in a preferences application.

Referring back to FIG. 7, in some examples, the one or more additional keyword engines may include custom command keyword engines. Cloud service providers, such as streaming audio services, may provide a custom keyword engine pre-configured with identification algorithms configured to spot service-specific command keywords. These service-specific command keywords may include commands for custom service features and/or custom names used in accessing the service.

For instance, the NMD 703 may include a particular streaming audio service (e.g., Apple Music) keyword engine. This particular keyword engine may be configured to detect command keywords specific to the particular streaming audio service and generate streaming audio service wake word events. For instance, one command keyword may be "Friends Mix," which corresponds to a command to play back a custom playlists generated from playback histories of one or more "friends" within the particular streaming audio service.

A custom keyword engine may be relatively more prone to false wake words than the keyword engine 770, as generally the keyword engine 770 is more sophisticated than a custom keyword engine. To mitigate this, custom command keywords may require one or more conditions to be satisfied before generating a custom command keyword event. Further, in some implementations, in an effort to reduce the prevalence of false positives, multiple conditions may be imposed as a requirement to include a custom keyword engine in the NMD 703.

These custom command keyword conditions may include service-specific conditions. For instance, command keywords corresponding to premium features or playlists may require a subscription as a condition. As another example, custom command keywords corresponding to a particular streaming audio service may require media items from that streaming audio service in the playback queue. Other conditions are possible as well.

To gate custom command keyword engines based on the custom command keyword conditions, the NMD 703 may comprise additional state machines 775 corresponding to each custom command keyword. Alternatively, the NMD 703 may implement a state machine 775 having respective states for each custom command keyword. Other examples are possible as well. These custom command conditions may depend on the state variables maintained by the devices within the MPS 100, and may also depend on state variables or other data structures representing a state of a user account of a cloud service, such as a streaming audio service.

In example embodiments, the keyword engine 770 may take a variety of forms. For example, the keyword engine 770 and the command keyword engine 771a may take the form of one or more modules that are stored in memory of the NMD 703a and/or the NMD 703b (e.g., the memory 112b of FIG. 1F). As another example, the keyword engine 770 may take the form of a general-purposes or special-purpose processor, or modules thereof. In this respect, multiple keyword engines may be part of the same component of the NMD 703a or each keyword engine may take the form of a component that is dedicated for the particular wake-word engine. Other possibilities also exist.

To further reduce false positives, the keyword engine 770 may utilize a relatively low sensitivity when compared with a VAS wake-word engine 770 (not shown). In practice, a wake-word engine may include a sensitivity level setting that is modifiable via the threshold value Thy set by the state machine 775. The sensitivity level may define a degree of similarity between a word identified in the detected sound stream and the keyword engine's one or more particular keywords that are considered to be a match (i.e., that triggers a keyword event). In other words, the sensitivity level defines how closely, as one example, the spectral characteristics in the detected sound stream must match the spectral characteristics of the engine's one or more wake words to be a wake-word trigger.

In this respect, the sensitivity level generally controls how many false positives that the keyword engine 770 a identifies. For example, if the keyword engine 770 is configured to identify the keyword "Play" with relatively high sensitivity, then false wake words, such as the phonetically similar "pay" or "lay", are more likely to cause the keyword engine 770 to flag the presence of the wake-word "Play." In contrast, if the keyword engine 770a is configured with relatively low sensitivity, then the false wake words of "pay" or "lay" are less likely to cause the keyword engine 770a to flag the presence of the command keyword "Play."

In practice, a sensitivity level may take a variety of forms. In example implementations, a sensitivity level takes the form of a threshold value My that defines a minimum confidence (i.e., probability) level for a keyword engine that serves as a dividing line between triggering or not triggering a keyword event when the keyword engine 770 is analyzing detected sound for its particular wake word. In this regard, a higher sensitivity level corresponds to a lower confidence threshold (and more false positives), whereas a lower sensitivity level corresponds to a higher confidence threshold (and fewer false positives). For example, lowering a keyword engine's confidence threshold configures it to trigger a keyword event when it identifies words that have a lower likelihood that they are the actual particular keyword, whereas raising the confidence threshold configures the engine to trigger a keyword event when it identifies words that have a higher likelihood that they are the actual particular wake word. Within examples, a sensitivity level of the keyword engine 770 may be based on more or more confidence scores, such as the confidence score in spotting a command keyword and/or a confidence score in determining intent. Other examples of sensitivity levels are also possible.

In example implementations, sensitivity level parameters (e.g., the range of sensitivities) for a particular keyword engine can be updated, which may occur in a variety of manners. As one possibility, a VAS or other third-party provider of a given wake-word engine may provide to the NMD 703 a keyword engine update that modifies one or more sensitivity level parameters for the given keyword engine 770. By contrast, the sensitive level parameters of the keyword engine 770 may be configured by the manufacturer of the NMD 703 or by another cloud service (e.g., for a custom wake-word engine 771b).

Notably, within certain examples, the NMD 703a foregoes sending any data representing the detected sound SD (e.g., the messages $M_V$) to a VAS when processing a voice input including a command keyword. In implementations including the local NLU 779, the NMD 703a can further process the voice utterance portion of the voice input (in addition to the keyword word portion) without necessarily sending the voice utterance portion of the voice input to the VAS. Accordingly, speaking a voice input (with a command keyword) to the NMD 703 may provide increased privacy relative to other NMDs that process all voice inputs using a VAS.

As indicated above, the keywords may be stored in a library of the local NLU (not shown) and correspond to parameters. These parameters may define to perform the command corresponding to the detected command keyword. When keywords are recognized in the voice input, the command corresponding to the detected command keyword is performed according to parameters corresponding to the detected keywords.

For instance, an example voice input may be "play music at low volume" with "play" being the command keyword portion (corresponding to a playback command) and "music at low volume" being the voice utterance portion. When analyzing this voice input, the NLU may recognize that "low volume" is a keyword in its library corresponding to a parameter representing a certain (low) volume level. Accordingly, the NLU may determine an intent to play at this lower volume level. Then, when performing the playback command corresponding to "play," this command is performed according to the parameter representing a certain volume level.

In a second example, another example voice input may be "play my favorites in the Kitchen" with "play" again being the command keyword portion (corresponding to a playback command) and "my favorites in the Kitchen" as the voice utterance portion. When analyzing this voice input, the NLU may recognize that "favorites" and "Kitchen" match keywords in its library. In particular, "favorites" corresponds to a first parameter representing particular audio content (i.e., a particular playlist that includes a user's favorite audio tracks) while "Kitchen" corresponds to a second parameter representing a target for the playback command (i.e., the kitchen 101h zone. Accordingly, the NLU may determine an intent to play this particular playlist in the kitchen 101h zone.

In a third example, a further example voice input may be "volume up" with "volume" being the command keyword portion (corresponding to a volume adjustment command) and "up" being the voice utterance portion. When analyzing this voice input, the NLU may recognize that "up" is a keyword in its library corresponding to a parameter representing a certain volume increase (e.g., a 10 point increase on a 100 point volume scale). Accordingly, the NLU may determine an intent to increase volume. Then, when performing the volume adjustment command corresponding to "volume," this command is performed according to the parameter representing the certain volume increase.

Within examples, certain command keywords are functionally linked to a subset of the keywords within the library of the local NLU, which may hasten analysis. For instance, the command keyword "skip" may be functionality linked to the keywords "forward" and "backward" and their cognates. Accordingly, when the command keyword "skip" is detected in a given voice input, analyzing the voice utterance portion of that voice input with the local NLU may involve determining whether the voice input includes any keywords that match these functionally linked keywords (rather than determining whether the voice input includes any keywords that match any keyword in the library of the local NLU). Since vastly fewer keywords are checked, this analysis is relatively quicker than a full search of the library. By contrast, a nonce VAS wake word such as "Alexa" provides no indication as to the scope of the accompanying voice input.

Some commands may require one or more parameters, as such the command keyword alone does not provide enough information to perform the corresponding command. For example, the command keyword "volume" might require a parameter to specify a volume increase or decrease, as the intent of "volume" of volume alone is unclear. As another example, the command keyword "group" may require two or more parameters identifying the target devices to group.

Accordingly, in some example implementations, when a given command keyword is detected in the voice input by the keyword engine 770, the local NLU may determine whether the voice input includes keywords matching keywords in the library corresponding to the required parameters. If the voice input does include keywords matching the required parameters, the NMD 703 proceeds to perform the command (corresponding to the given command keyword) according to the parameters specified by the keywords.

However, if the voice input does include keywords matching the required parameters for the command, the NMD 703 may prompt the user to provide the parameters. For instance, in a first example, the NMD 703 may play an audible prompt such as "I've heard a command, but I need more information" or "Can I help you with something?" Alternatively, the NMD 703 may send a prompt to a user's personal device via a control application (e.g., the software components 132c of the control device(s) 104).

In further examples, the NMD 703 may play an audible prompt customized to the detected command keyword. For instance, after detecting a command keyword corresponding to a volume adjustment command (e.g., "volume"), the audible prompt may include a more specific request such as "Do you want to adjust the volume up or down?" As another example, for a grouping command corresponding to the command keyword "group," the audible prompt may be "Which devices do you want to group?" Supporting such specific audible prompts may be made practicable by supporting a relatively limited number of command keywords (e.g., less than 100), but other implementations may support more command keywords with the trade-off of requiring additional memory and processing capability.

Within additional examples, when a voice utterance portion does not include keywords corresponding to one or more required parameters, the NMD 703 may perform the corresponding command according to one or more default parameters. For instance, if a playback command does not include keywords indicating target playback devices 102 for playback, the NMD 703 may default to playback on the NMD 703 itself (e.g., if the NMD 703 is implemented within a playback device 102) or to playback on one or more associated playback devices 102 (e.g., playback devices 102 in the same room or zone as the NMD 703). Further, in some examples, the user may configure default parameters using a graphical user interface (e.g., user interface 430) or voice user interface. For example, if a grouping command does not specify the playback devices 102 to group, the NMD 703 may default to instructing two or more pre-configured default playback devices 102 to form a synchrony group. Default parameters may be stored in data storage (e.g., the memory 112b (FIG. 1F)) and accessed when the NMD 703 determines that keywords exclude certain parameters. Other examples are possible as well.

In some cases, the NMD 703 sends the voice input to a VAS when the local NLU is unable to process the voice input (e.g., when the local NLU is unable to find matches to keywords in the library, or when the local NLU has a low confidence score as to intent). In an example, to trigger sending the voice input, the NMD 703 may generate a bridging event, which causes the voice extractor 773 to process the sound-data stream SD, as discussed above. That is, the NMD 703 generates a bridging event to trigger the voice extractor 773 without a keyword being detected by the keyword engine 770 (instead of based on a command keyword in the voice input, as well as the NLU being unable to process the voice input).

Before sending the voice input to the VAS (e.g., via the messages $M_V$), the NMD 703 may obtain confirmation from the user that the user acquiesces to the voice input being sent to the VAS. For instance, the NMD 703 may play an audible prompt to send the voice input to a default or otherwise configured VAS, such as "I'm sorry, I didn't understand that. May I ask Alexa?" In another example, the NMD 703 may play an audible prompt using a VAS voice (i.e., a voice that is known to most users as being associated with a particular VAS), such as "Can I help you with something?" In such examples, the generation of the bridging event (and triggering of the voice extractor 773) is contingent on a second affirmative voice input from the user.

Within certain example implementations, the local NLU may process the signal $S_{ASR}$ without necessarily a command keyword event being generated by the keyword engine 770 (i.e., directly). That is, the automatic speech recognition may be configured to perform automatic speech recognition on the sound-data stream SD, which the local NLU processes for matching keywords without requiring a command keyword event. If keywords in the voice input are found to match keywords corresponding to a command (possibly with one or more keywords corresponding to one or more parameters), the NMD 703 performs the command according to the one or more parameters.

e. Volume Adjustment

As mentioned previously, the NMD 703 may include one or more sensors (not shown) that output a signal indicating whether one or more users are in proximity to the NMD 703. Example sensors include a temperature sensor, an infrared sensor, an imaging sensor, and/or a capacitive sensor, among other examples. The NMD 703 may use the output from such sensors to set one or more state variables indicating whether one or more users are in proximity to the NMD 703. Other methods, as discussed above may also be used to indicate the presence (or lack thereof) of a user in the proximity of the NMD 703. Then, the state machine 775 may use the presence or lack thereof as a condition for the state machine 775. For instance, the state machine 775 may enable the keyword engine 770 when at least one user is in proximity to the NMD 703. Similarly, the noise classifier 776 may only enable the keyword engine 770 when some background speech is detected since this is indicative of a user being in the proximity of the NMD 703.

In such examples, the local NLU may process the signal directly only when certain conditions are met. In particular, in some embodiments, the local NLU processes the signal only when the state machine 775 is in the first state. The certain conditions may include a condition corresponding to no background speech in the environment. An indication of whether background speech is present in the environment may come from the noise classifier 766. As noted above, the noise classifier 766 may be configured to output a signal or set a state variable indicating that far-field speech is present in the environment. Further, another condition may correspond to voice activity in the environment. The VAD 765 may be configured to output a signal or set a state variable indicating that voice activity is present in the environment. Similarly, the prevalence of false positive detection of commands with a direct processing approach may be mitigated using the conditions determined by the state machine 775*a*.

In some examples, the library of the local NLU is partially customized to the individual user(s). In a first aspect, the library may be customized to the devices that are within the household of the NMD (e.g., the household within the environment 101 (FIG. 1A)). For instance, the library of the local NLU may include keywords corresponding to the names of the devices within the household, such as the zone names of the playback devices 102 in the MPS 100. In a second aspect, the library may be customized to the users of the devices within the household. For example, the library of the local NLU may include keywords corresponding to names or other identifiers of a user's preferred playlists, artists, albums, and the like. Then, the user may refer to these names or identifiers when directing voice inputs to the keyword engine 770 and the local NLU.

Furthermore, the proximity of one or more users of a playback system in the home environment and/or relative to a location of one or more of the NMDs 103 can be determined using one or more of the components described above can operate in conjunction with the microphones 720. Techniques for determining the location or proximity of a user may include one or more techniques disclosed in previously-referenced U.S. patent application Ser. No. 15/438,749, U.S. Pat. No. 9,084,058 filed Dec. 29, 2011, and titled "Sound Field Calibration Using Listener Localization," and U.S. Pat. No. 8,965,033 filed Aug. 31, 2012, and titled "Acoustic Optimization." Each of these applications is herein incorporated by reference in its entirety.

The proximity detector 780, as mentioned above, may provide proximity information $P_I$ to the state machine 775. Based on the detected proximity of one or more users, whether sensor information received a sensor of the NMD 703 or wireless signal information analyzed by the signal analyzer 782, an action may be undertaken. The proximity information $P_I$ may be used to indicate the presence of a user or lack thereof, in the vicinity of the NMD 703, and may trigger a volume adjustment event VA. The volume adjustment event VA causes the output volume of one or more speakers 790 of the NMD 703 to be adjusted accordingly. In some examples, the volume adjustment event VA may be transmitted to one or more other NMDs (not shown) of a media playback system, such as NMDs forming a group and/or zone with NMD 703, such that a group/zone volume is adjusted.

The proximity information $P_I$ may be combined with other inputs received to determine how to adjust the volume. In some examples, other inputs, such as the sound-data stream $S_{DS}$ can be used solely to determine whether to adjust the volume, and proximity information $P_I$ is not considered by the state machine when making the determination.

For example, the proximity detector 780 may determine that at least one user is in close proximity to the NMD 703. As mentioned above, the proximity of the at least one user may be determined based on an analysis of a wireless signal (such as changes in the CSI/RSSI) or based on one or more sensors (not shown) of the NMD 703. As a result of determining that a user is in close proximity to the NMD 703, the state machine 775 may generate a volume adjustment event VA which indicates that the volume output by a speaker 790 of the NMD 703 is reduced since the user is in close proximity.

Further, changes in the position of users within the environment may also be used to determine by the state machine whether a volume adjustment event VA should be generated. For example, when it is determined that a user is moving away from the NMD 703 the volume adjustment event VA may indicate that the volume is to be increased to compensate for the fact that the user is further away from the NMD 703.

In yet another example, environmental aspects, such as background noise, maybe analyzed using the noise classifier 766 of the VCC 760, and changes in the background noise may cause the state machine 775 to generate a volume adjustment event VA which indicates that the volume output by a speaker 790 of the NMD 703 is increased to compensate for the increase in background noise. If a background noise received by the one or more microphones of the playback device is classified as 'speech-like' and if two people are in the proximity of the playback device the state machine may generate an appropriate volume adjustment event VA. For example, when a non-'speech-like' background noise is detected reducing or decreasing the output volume might be undesirable as this would make it more difficult for users to hear the output of the playback device. However, if 'speech-like' background noise is detected for at least a pre-determined period, it is more likely that a conversation between two people is occurring. Therefore, reducing or decreasing the output volume will improve the user experience by facilitating the conversation.

In other examples, inputs from multiple sources may be used by the state machine 775 to determine whether to generate a volume adjustment event VA. One such example may include the noise classifier 766 and/or voice activity detector 765 determining that a conversation is occurring based on detected speech patterns within the sound data SD captured by the microphones 720. In combination with the proximity detector 780 determining that there is more than one user proximate to the NMD 703. The combination of these two environmental characteristics is indicative that two or more users are having a conversation in the vicinity of the NMD 703, and therefore the state machine 775 can generate a volume adjustment event VA which decreases the volume of a speaker 790 of the NMD 703 to facilitate the conversation.

As mentioned previously, the volume adjustment event VA may be shared with other NMDs or playback devices of a media playback system, such that the output volume is adjusted for all playback devices/NMDs in the same group/zone. For example, the volume adjustment event may be transmitted to all playback devices 102d, 102m within the living room 101f if one of the NMDs/playback devices 102d, 102m in the living room 101f determines that a volume adjustment event should be generated.

IV. Example Modification Techniques Based on Environmental Characteristics

FIG. 9 is a flow diagram showing an example method 900 for adjusting an output volume based on a detected change in environmental characteristics. The method 900 may be performed by a playback device and/or an NMD 103s (FIG. 1A), which may include the features of the NMD 703 (FIG. 7). In some implementations, the NMD is implemented within a playback device, as illustrated by the playback device 102r (FIG. 1G). The NMD and/or playback device may form part of a media playback system comprising a plurality of playback devices and/or NMDs.

At block 901, the method 900 involves receiving an input representing at least one environmental characteristic of a real-world environment. For example, the input may be an input sound-data stream comprising a keyword event and/or background noise. For instance, the keyword engine 770 of the NMD 703 may monitor the input sound-data stream for one or more keywords using a keyword identification algorithm as described above in relation to FIG. 7. Similarly, the input sound-data stream may be analyzed using a noise classifier to determine whether the input sound-data stream comprises a background noise. For example, the noise classifier may indicate that the input sound-data stream contains data indicative of flowing water from a kitchen appliance, and/or data indicative of a conversation occurring between two or more people.

Other inputs may also be received. For example, inputs representing the proximity of one or more people to the NMD 703 may be received. These inputs may take many forms as will be appreciated by the skilled person, such as changes in characteristics of a wireless signal received by the NMD 703, and/or other sensors forming part of the NMD 703 such as an infra-red sensor. As described above, changes in wireless signal characteristics such as RSSI and/or CSI can indicate the presence or lack thereof of one or more people within the environment. Such characteristics may also be used to represent changes in the environment, such as the repositioning of furniture.

At block 903, changes in the environmental characteristics are determined based on the received input. The changes in the environmental characteristics may be based on differences in received inputs obtained at a first and second time or may be based on a comparison between a baseline and the received inputs. As mentioned above, the environmental characteristics may be based on at least one of the proximity of at least one person to the playback device/NMD and a detected sound. In some examples, environmental characteristics representative of both the proximity of at least one person and a detected sound may be used.

At block 905, the determined change in the environmental characteristic is used to inform whether an adjustment to an output volume is required. For example, where the change in the environmental characteristics indicates that one or more people are close to the playback device/NMD, then the output volume may be reduced to cater for the closer proximity of the person to the speaker of the playback device. In yet a further example, where the change in the environmental characteristics indicate that there has been an increase in the amount of background noise, or that the background noise exceeds a predetermined threshold value, then the output volume may be increased to reflect this environmental change, making it easier for people to hear the output.

It will be appreciated that combinations of different types of input may be used to determine whether to adjust the output volume. One example includes using the proximity detectors of an NMD/playback device to determine whether two or more people are in the vicinity and analyzing an input sound-data stream to determine whether there are indications that a conversation between two or more people. The combination of these indications of two environmental characteristics suggest that a conversation is happening between the two or more people. As such, the change in these environmental characteristics may be used to decrease the output volume such that it facilitates the conversation between the two or more people.

FIG. 10 is a flow diagram showing an example method 1000 for adjusting a keyword detection threshold based on a detected change in environmental characteristics. The method 1000 may be performed by a playback device and/or an NMD 103s (FIG. 1A), which may include the features of the NMD 703 (FIG. 7). In some implementations, the NMD is implemented within a playback device, as illustrated by the playback device 102r (FIG. 1G). The NMD and/or playback device may form part of a media playback system comprising a plurality of playback devices and/or NMDs.

At block 1001, the method 1000 involves receiving an input representing at least one environmental characteristic of a real-world environment. For example, the input may be an input sound-data stream comprising a keyword event and/or background noise. For instance, the keyword engine 770 of the NMD 703 may monitor the input sound-data stream for one or more keywords using a keyword identification algorithm as described above in relation to FIG. 7. Similarly, the input sound-data stream may be analyzed using a noise classifier to determine whether the input sound-data stream comprises a background noise. For example, the noise classifier may indicate that the input sound-data stream contains data indicative of flowing water from a kitchen appliance, and/or data indicative of a conversation occurring between two or more people.

Other inputs may also be received. For example, inputs representing the proximity of one or more people to the NMD 703 may be received. These inputs may take many forms as will be appreciated by the skilled person, such as changes in characteristics of a wireless signal received by the NMD 703, and/or other sensors forming part of the NMD 703 such as an infra-red sensor. As described above, changes in wireless signal characteristics such as RSSI and/or CSI can indicate the presence or lack thereof of one or more people within the environment. Such characteristics may also be used to represent changes in the environment, such as the repositioning of furniture.

At block 1003, changes in the environmental characteristics are determined based on the received input. The changes in the environmental characteristics may be based on differences in received inputs obtained at a first and second time, or maybe based on a comparison between a baseline and the received inputs. As mentioned above, the environmental characteristics may be based on at least one of the proximity of at least one person to the playback device/NMD and a detected sound. In some examples, environmental characteristics representative of both the proximity of at least one person and a detected sound may be used.

At block 1005, the determined change in the environmental characteristic is used to inform whether an adjustment to the keyword detection threshold is required. For example, where the change in the environmental characteristics indicates that one or more people are close to the playback device/NMD, then the keyword detection threshold may be reduced since it is more likely that a person will be wanting to interact with the NMD when they are closer to it. In yet a further example, where the change in the environmental characteristics indicate that there has been an increase in the amount of background noise, or that the background noise exceeds a predetermined threshold value, then the keyword detection threshold may be decreased to reflect this environmental change, making it more likely that keywords will be detected. In another example, if the change in the environmental characteristic indicates noise which is classified as background speech, the keyword detection threshold may be increased to reduce the likelihood of a false positive detection of a keyword from the background speech was not intended as such.

Combinations of changes in environmental characteristics may be used to determine an action. For example, when it is determined that there is increased voice activity and there are two or more users close by, then the keyword detection threshold may be decreased to reflect the fact that voice commands are unlikely to be issued during a general conversation.

In some examples, user preferences may be used to determine what adjustment is to be made. For example, where there is an increase in the amount of voice activity detected, then the keyword detection threshold may be increased since a user is unlikely to issue a voice command in general conversation. Alternatively, when increased voice activity is detected then the keyword detection threshold may be decreased to make it more likely that commands are picked up and actioned. As such, a user may specify what action to take based on their needs. Such user preferences may relate to any number of different environmental characteristics and selected output actions including adjusting the volume output.

V. Illustrative Examples

Figure 11:
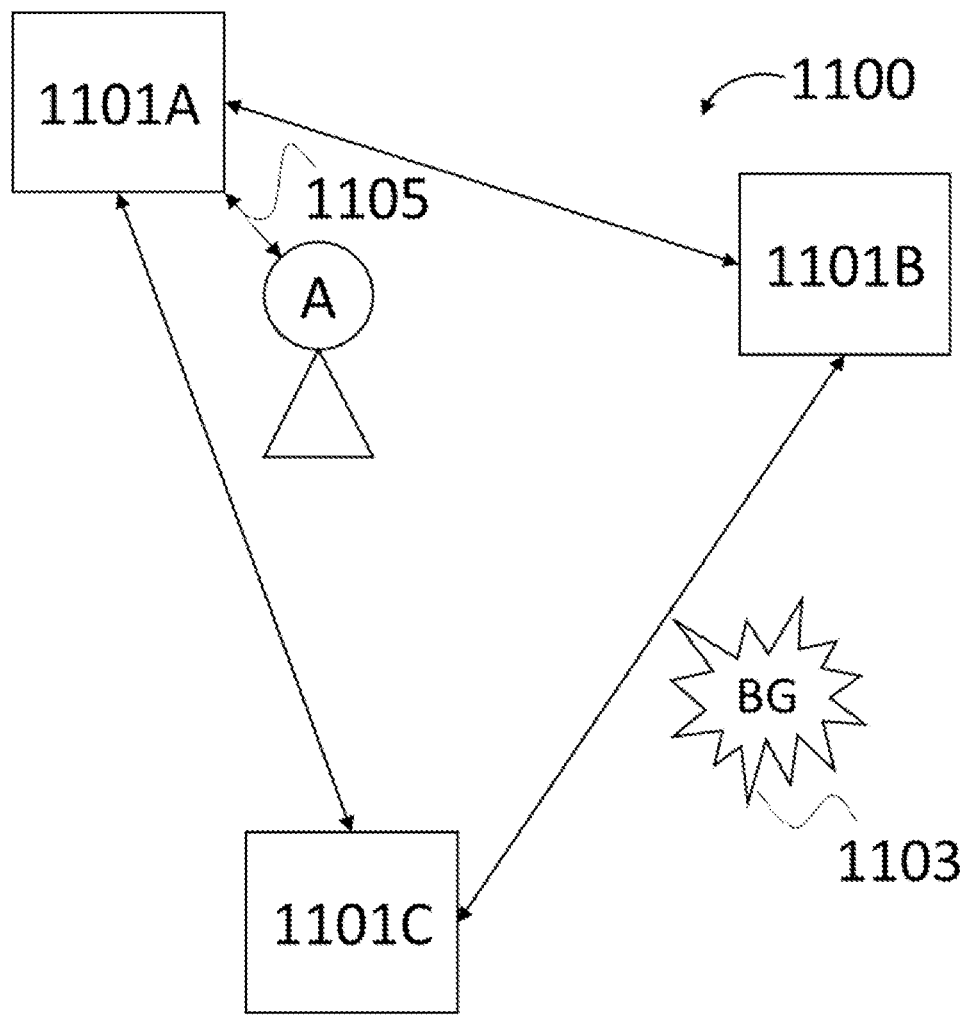
FIG. 11 is a schematic representation of a first exemplary media playback system in accordance with aspects of the disclosure.
Figure 12:
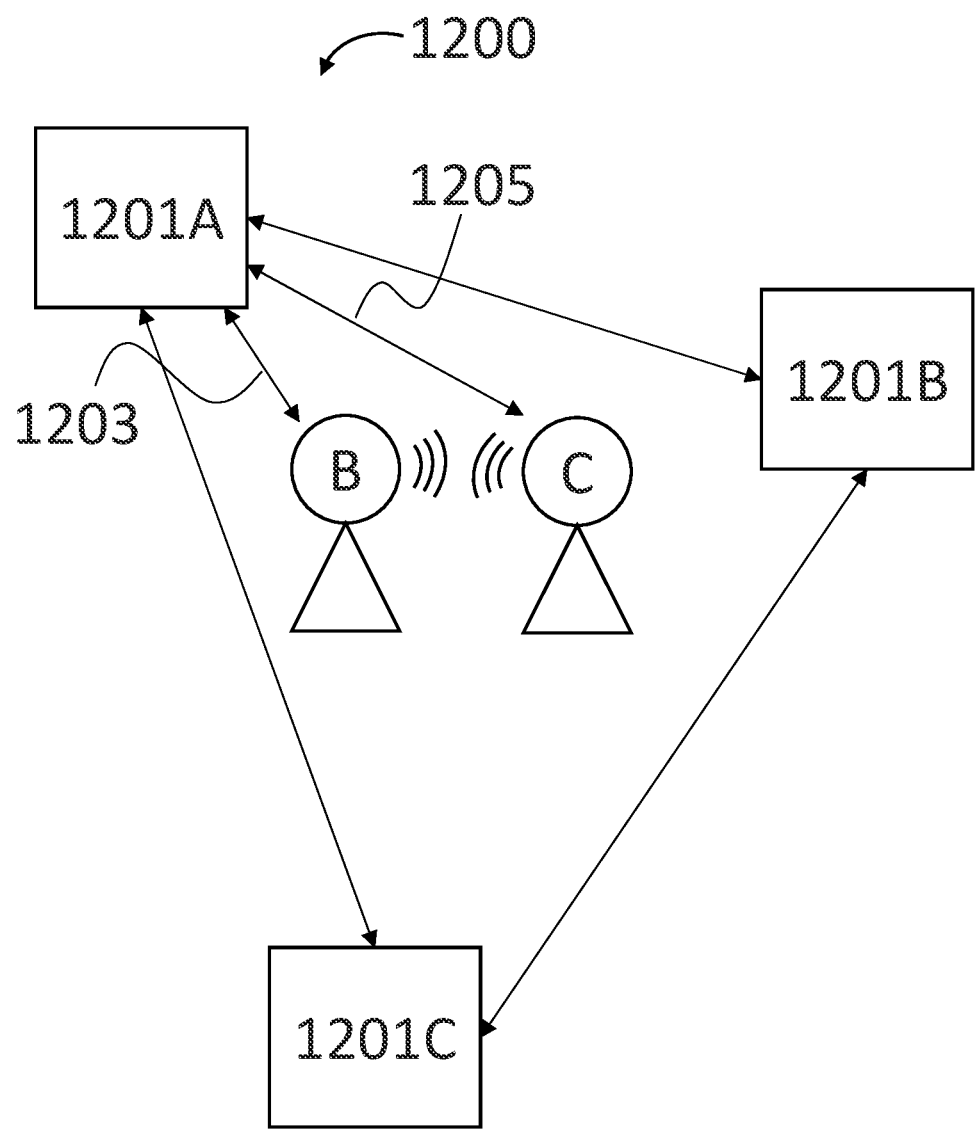
FIG. 12 is a schematic representation of a second exemplary media playback system in accordance with aspects of the disclosure The drawings are for purposes of illustrating example embodiments, but it should be understood that the inventions are not limited to the arrangements and instrumentality shown in the drawings. In the drawings, identical reference numbers identify at least generally similar elements. To facilitate the discussion of any particular element, the most significant digit or digits of any reference number refers to the Figure in which that element is first introduced. For example, element 103a is first introduced and discussed with reference to FIG. 1A.

FIGS. 11 and 12 show schematic representation of an exemplary media playback systems configured in accordance with aspects of the disclosure.

FIG. 11 illustrates a media playback system 1100 comprising three NMDs or playback devices 1101A, 1101B, 1101C. The three NMDs or playback devices are each connected to a wireless network and are capable of communicating wirelessly with one another as indicated by the arrows between them. It will be appreciated that the media playback system 1100 may comprise more or less than three NMDs/playback devices. The wireless signals between NMDs or playback devices enable each device to know relatively how far away another device is, using characteristics of the wireless signal, such as CSI or RSSI as described above. Changes in this wireless signal can also be detected. For example, if person A enters the environment of the media playback system, they will affect the strength of the wireless signal between each of the NMDs/playback devices. The change in the wireless signal characteristics can then be used to estimate a potential location of person A within the environment of the media playback system based on the distance 1105 from one or more of the NMDs/playback devices.

In some examples, hardware forming part of the NMDs/playback devices, such as proximity sensors may be used to determine whether person A is in the vicinity of an NMD/playback device.

Similarly, when background noises 1103 are detected by one or more microphones in at least one of the NMDs, then this information can also be used to determine what action to be taken.

In the example of FIG. 11, a single person, A, is close to NMD 1101A, and there is a large amount of background noise. As such, NMD 1101A, or one of the other NMDs/playback devices 1101B, 1101C may determine that it would be beneficial to increase the volume due to the amount of background noise. This instruction may be sent to all NMDs/playback devices in a given zone or group, or may be used only by one of the NMDs/playback devices. Furthermore, in some examples it may be determined that different NMDs/playback devices should adjust the volume output differently. For example, NMD 1101A may increase the volume by a lesser amount in comparison to NMD/playback devices 1101B and 1101C since person A is closer to NMD 1101A.

In addition, the keyword detection threshold for any one of the NMDs may be reduced to reflect the current environment, where a person A is close to NMD 1101A and there is a large amount of background noise, thereby making it more likely that person A's uttered commands will be picked up and processed accordingly.

FIG. 12 illustrates a media playback system 1200 comprising three NMDs or playback devices 1201A, 1201B, 1201C. The media playback system 1200 may be the same media playback system 1100 as described above in relation to FIG. 11. The three NMDs or playback devices are each connected to a wireless network and are capable of communicating wirelessly with one another as indicated by the arrows between them. It will be appreciated that the media playback system 1100 may comprise more or less than three NMDs/playback devices. The wireless signals between NMDs or playback devices enables each device to know relatively how far away another device is, using characteristics of the wireless signal, such as CSI or RSSI as described above. Changes in this wireless signal can also be detected. For example, if person B and person C enter the environment of the media playback system, they will affect the strength of the wireless signal between each of the NMDs/playback devices. The change in the wireless signal characteristics can then be used to estimate a potential location of person B and person C within the environment of the media playback system based on the distances 1203 and 1205 from one or more of the NMDs/playback devices.

In addition to determining that there are people in the environment of the media playback system 1200, one or more microphones of at least one NMD 1201A may receive an input sound-data stream which when processed indicates that there is a conversation taking place between person A and person B. If it is determined that a conversation is taking place between person B and person C, then the volume of at least one of the NMDs/playback devices may be decreased in order to facilitate the conversation. In some examples, the keyword detection threshold may also be increased since it is unlikely that person B or person C would intend to utter a keyword during the conversation.

VI. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well-known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples may be combined in any combination, and placed into a respective independent example. The other examples can be presented in a similar manner.

Example 1: A playback device comprising at least one speaker; at least one processor; and data storage having instructions stored thereon that are executed by the at least one processor to cause the playback device to perform functions comprising: receiving input representing one or more environmental characteristics of a real-world environment; determining at least one change in the one or more environmental characteristics based on the input, wherein the one or more environmental characteristics are representative of at least one of a proximity of at least one person to the playback device and a detected sound; and adjusting an output volume of the playback device based on the determined change in the one or more environmental characteristics.

Example 2: The playback device of Example 1, further comprising: at least one microphone; wherein: the input is an input sound data stream from the at least one microphone; and the determining a change in the one or more environmental characteristics comprises analyzing the input sound data stream.

Example 3: The playback device of Example 2, wherein the determining a change in the one or more environmental characteristics comprises classifying the input sound data stream as background speech; and the adjusting the output volume of the playback device comprises decreasing the volume.

Example 4: The playback device of Example 1, wherein the playback device is one of a plurality of playback devices of a playback system, the playback device further comprising: a wireless network interface; wherein: the input comprises wireless signal strength data of wireless signals received via the network interface from at least one other of the plurality of playback devices of the playback system; and the determining a change in the one or more environmental characteristics comprises: determining a proximity of at least one person based on the wireless signal strength data.

Example 5: The playback device of Example 4, wherein the wireless signal strength data comprises at least one of channel state information and received signal strength indication.

Example 6: The playback device of Example 1, wherein the playback device is part of a playback system comprising a plurality of other playback devices, and wherein adjusting the output volume comprises transmitting a volume adjustment command to at least one of the plurality of other playback devices.

Example 7: The playback device of Example 1, wherein: the input comprises a signal received from a portable device; and the determining at least one change in the one or more environmental characteristics comprises determining a proximity of at least one person based on the signal.

Example 8: The playback device of Example 1, wherein the determining at least one change in the one or more environmental characteristics comprises determining a proximity of a single person to the playback device and a detected sound, and adjusting the output volume of the playback device comprises increasing the output volume.

Example 9: The playback device of Example 1, wherein the determining at least one change in the one or more environmental characteristics comprises determining a proximity of at least two people to the playback device and a detected sound; and adjusting the output volume of the playback device comprises decreasing the output volume.

Example 10: A method performed by a playback device, comprising: receiving an input representing one or more environmental characteristics of a real-world environment; determining at least one change in the one or more environmental characteristics, wherein the one or more environmental characteristics are representative of at least one of a proximity of at least one person to a playback device and a detected sound; and adjusting an output volume of the playback device based on the detected change in the one or more environmental characteristics.

Example 11: A playback device comprising: at least one speaker; at least one processor; and data storage having instructions stored thereon that are executed by the at least one processor to cause the playback device to perform functions comprising: receiving an input representing one or more environmental characteristics of a real-world environment; determining at least one change in the one or more environmental characteristics, wherein the one or more environmental characteristics are representative of at least one of a proximity of at least one person to the playback device and a detected sound; and adjusting a keyword detection threshold based on the determined change in the one or more environmental characteristics.

Example 12: The playback device of Example 11, further comprising: at least one microphone; wherein: the input is an input sound data stream from the at least one microphone; and the determining a change in the one or more environmental characteristics comprises analyzing the input sound data stream.

Example 13: The playback device of Example 12, wherein the determining a change in the one or more environmental characteristics comprises classifying the input sound data stream, and adjusting the keyword detection threshold is based on the classified input sound data stream.

Example 14: The playback device of Example 13, wherein: the classified input sound data stream is representative of background speech; and the keyword detection threshold is increased.

Example 15: The playback device of Example 13, wherein: the classified input sound data stream is representative of background noise; and the keyword detection threshold is decreased when a volume represented by the input sound data stream increases.

Example 16: The playback device of Example 12, wherein the analyzing determines that the input sound data stream comprises at least one supported keyword of the playback device; and the adjusting comprises decreasing the keyword detection threshold.

Example 17: The playback device of Example 11, wherein the one or more environmental characteristics include a proximity of at least one person, and the keyword detection threshold is decreased when it determined that at least one person has moved closer to the playback device.

Example 18: The playback device of Example 17, wherein the playback device is one of a plurality of playback devices of a playback system, the playback device further comprising: a wireless network interface; wherein: the input comprises wireless signal strength data of wireless signals received via the network interface from at least one other of the plurality of playback devices of the playback system; and the determining a change in the one or more environmental characteristics comprises: determining a proximity of at least one person based on the wireless signal strength data.

Example 19: The playback device of Example 11, wherein: the one or more environmental characteristics are representative of both a proximity of at least one person to the playback device and a detected sound; the determining at least one change in the one or more environmental characteristics comprises determining that at least one person is near the playback device and the detected sound is representative of background speech; and the adjusting the keyword detection threshold comprises increasing the keyword detection threshold.

Example 20: A method performed by a playback device, comprising: receiving an input representing one or more environmental characteristics of a real-world environment; determining at least one change in the one or more environmental characteristics, wherein the one or more environmental characteristics are representative of at least one of a proximity of at least one person to the playback device and a detected sound; and adjusting a keyword detection threshold based on the determined change in the one or more environmental characteristics.

The invention claimed is:

1. A playback device comprising:
   at least one audio transducer;
   at least one processor; and
   data storage having instructions stored thereon that are executed by the at least one processor to cause the playback device to perform functions comprising:
   receiving input representing one or more environmental characteristics of a real-world environment;
   determining at least one change in the one or more environmental characteristics based on the input, wherein the one or more environmental characteristics are representative of at least one of a proximity of at least one person to the playback device and a detected sound;
   when the determining step determines a proximity of a single person to the playback device and detects a sound;
   increasing an output volume of the playback device; and
   reducing a keyword detection threshold for the playback device; and
   when the determining step determines a proximity of at least two people to the playback device and detects a sound:
   decreasing the output volume of the playback device; and
   increasing the keyword detection threshold for the playback device.

2. The playback device of claim 1, further comprising at least one microphone, wherein:
   the input is an input sound data stream from the at least one microphone; and
   the determining a change in the one or more environmental characteristics comprises analyzing the input sound data stream.

3. The playback device of claim 2, wherein the operations further comprise:
   when the determining a change in the one or more environmental characteristics comprises classifying the input sound data stream as background speech:
   decreasing the output volume of the playback device.

4. The playback device of claim 1, wherein the playback device is one of a plurality of playback devices of a playback system, the playback device further comprising, a wireless network interface, wherein:
   the input comprises wireless signal strength data of wireless signals received via the network interface from at least one other of the plurality of playback devices of the playback system; and
   the determining a change in the one or more environmental characteristics comprises determining a proximity of at least one person based on the wireless signal strength data.

5. The playback device of claim 1, wherein the playback device is part of a playback system comprising a plurality of other playback devices, and wherein the operations further comprise transmitting a volume adjustment command to at least one of the plurality of other playback devices.

6. A method performed by a playback device, comprising:
   receiving a first input representing one or more first environmental characteristics of a real-world environment;
   determining at least one change in the one or more first environmental characteristics, wherein the one or more first environmental characteristics are representative of a proximity a single person to a playback device and a detected sound; and based on determining the proximity of the single person to the playback device and detecting the sound:
adjusting an output volume of the playback device; and
reducing a keyword detection threshold for the playback device;

receiving a second input representing one or more second environmental characteristics of a real-world environment;

determining at least one change in the one or more second environmental characteristics, wherein the one or more second environmental characteristics are representative of a proximity of at least two people to the playback device and a detected sound; and based on determining the proximity of at least two people to the playback device and detecting the sound:
decreasing the output volume of the playback device; and
increasing the keyword detection threshold for the playback device.

7. The method of claim 6, wherein:
the first input is an input sound data stream from at least one microphone of the playback device; and
the determining a change in the one or more environmental characteristics comprises analyzing the input sound data stream.

8. The method of claim 7, wherein:
the determining a change in the one or more second environmental characteristics comprises classifying the input sound data stream as background speech.

9. The method of claim 6, wherein the playback device is one of a plurality of playback devices of a playback system, wherein:
the first input comprises wireless signal strength data of wireless signals received via a network interface of the playback device from at least one other of the plurality of playback devices of the playback system; and
the determining a change in the one or more first environmental characteristics comprises determining a proximity of at least one person based on the wireless signal strength data.

10. The method of claim 6, wherein the playback device is part of a playback system comprising a plurality of other playback devices, and wherein method further comprises transmitting a volume adjustment command to at least one of the plurality of other playback devices.

11. One or more tangible, non-transitory computer-readable media storing instructions that, when executed by one or more processors of a playback device, cause the playback device to perform operations comprising:

receiving an input representing one or more environmental characteristics of a real-world environment;

determining at least one change in the one or more environmental characteristics, wherein the one or more environmental characteristics are representative of at least one of a proximity of at least one person to a playback device and a detected sound; and when the determining step determines a proximity of a single person to the playback device and detects a sound:
increasing an output volume of the playback device; and
reducing a keyword detection threshold for the playback device; and when the determining step determines a proximity of at least two people to the playback device and detects a sound:
decreasing an output volume of the playback device; and
increasing a keyword detection threshold for the playback device.

12. The computer-readable media of claim 11, wherein:
the input is an input sound data stream from at least one microphone of the playback device; and
the determining a change in the one or more environmental characteristics comprises analyzing the input sound data stream.

13. The computer-readable media of claim 11, wherein:
the playback device is one of a plurality of playback devices of a playback system;
the input comprises wireless signal strength data of wireless signals received via a network interface of the playback device from at least one other of the plurality of playback devices of the playback system; and
the determining a change in the one or more environmental characteristics comprises determining a proximity of at least one person based on the wireless signal strength data.

14. The computer-readable media of claim 11, wherein the playback device is part of a playback system comprising a plurality of other playback devices, and wherein the operations further comprise transmitting a volume adjustment command to at least one of the plurality of other playback devices.

15. The computer-readable media of claim 11, wherein the operations further comprise, when the determining a change in the one or more environmental characteristics comprises classifying the input sound data stream as background speech:
decreasing the output volume of the playback device.

* * * * *